US010415961B2

(12) United States Patent
Hakozaki

(10) Patent No.: US 10,415,961 B2
(45) Date of Patent: Sep. 17, 2019

(54) APPARATUS FOR MEASURING WINDING ANGLE OF CARBON FIBER WOUND ON BASE MATERIAL WITH RESPECT TO BASE MATERIAL AND METHOD OF MEASURING WINDING ANGLE

(71) Applicant: TOYOTA JIDOSHA KABUSHIKI KAISHA, Toyota-shi, Aichi-ken (JP)

(72) Inventor: Yoshimasa Hakozaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 156 days.

(21) Appl. No.: 15/474,112

(22) Filed: Mar. 30, 2017

(65) Prior Publication Data

US 2017/0292834 A1 Oct. 12, 2017

(30) Foreign Application Priority Data

Apr. 12, 2016 (JP) .................. 2016-079543

(51) Int. Cl.
*G01B 11/26* (2006.01)
*H04N 5/225* (2006.01)
*H04N 7/18* (2006.01)

(52) U.S. Cl.
CPC .......... *G01B 11/26* (2013.01); *H04N 5/2256* (2013.01); *H04N 7/183* (2013.01)

(58) Field of Classification Search
CPC ....... G01B 11/26; H04N 5/2256; H04N 7/183
USPC ......................................... 348/88
See application file for complete search history.

(56) References Cited

U.S. PATENT DOCUMENTS

| 5,210,594 | A | 5/1993 | Durand | |
|---|---|---|---|---|
| 6,149,856 | A * | 11/2000 | Zemel | B29C 35/0288 264/401 |
| 6,580,813 | B1 * | 6/2003 | Hermanns | B65H 67/062 382/111 |
| 2006/0098200 | A1 * | 5/2006 | Birlem | G01N 21/8915 356/429 |
| 2014/0009599 | A1 * | 1/2014 | Ledford | H04N 7/18 348/86 |

(Continued)

FOREIGN PATENT DOCUMENTS

EP 0 514 989 A1 11/1992
GB 1 484 418 A 9/1977

(Continued)

*Primary Examiner* — Deirdre L Beasley
(74) *Attorney, Agent, or Firm* — Finnegan, Henderson, Farabow, Garrett & Dunner, LLP

(57) ABSTRACT

A measuring apparatus for measuring a winding angle of a carbon fiber wound on a base material with respect to the base material includes a light source configured to radiate light to a target region on the base material serving as a measuring target for the winding angle, a diffusion plate configured to suppress linear transmission of reflected light from the target region and form an image constituted by the reflected light, an imaging device configured to capture the image formed by the diffusion plate to obtain a captured image, and a winding angle calculation unit configured to calculate an angle formed between a direction perpendicular to a longitudinal direction of an image constituted by the reflected light in the captured image and a reference direction in the base material as the winding angle.

15 Claims, 23 Drawing Sheets

(56) References Cited

U.S. PATENT DOCUMENTS

| | | | | |
|---|---|---|---|---|
| 2015/0053844 | A1* | 2/2015 | Kitamura | G02B 3/005 |
| | | | | 250/208.1 |
| 2015/0153002 | A1* | 6/2015 | Tanabe | B29C 53/602 |
| | | | | 156/64 |
| 2015/0239181 | A1* | 8/2015 | Corradini | B65H 23/0328 |
| | | | | 156/64 |
| 2015/0290882 | A1* | 10/2015 | Hatta | B29C 53/8016 |
| | | | | 156/175 |
| 2015/0323309 | A1* | 11/2015 | Kabetani | G01B 11/00 |
| | | | | 29/623.1 |
| 2016/0077019 | A1* | 3/2016 | Mathon | G01N 21/898 |
| | | | | 356/238.1 |
| 2016/0264375 | A1* | 9/2016 | Hatta | B29C 70/32 |

FOREIGN PATENT DOCUMENTS

| | | |
|---|---|---|
| GB | 1 494 264 A | 12/1977 |
| JP | H07-229708 A | 8/1995 |
| JP | 11-269790 | 10/1999 |
| JP | 2009-046206 A | 3/2009 |
| JP | 2013-160745 | 8/2013 |
| JP | 2014-233852 | 12/2014 |
| JP | 2015-93780 | 5/2015 |

* cited by examiner

APPARATUS FOR MEASURING WINDING ANGLE OF CARBON FIBER WOUND ON BASE MATERIAL WITH RESPECT TO BASE MATERIAL AND METHOD OF MEASURING WINDING ANGLE

INCORPORATION BY REFERENCE

The disclosure of Japanese Patent Application No. 2016-079543 filed on Apr. 12, 2016 including the specification, drawings and abstract is incorporated herein by reference in its entirety.

BACKGROUND

1. Technical Field

The present disclosure relates to an apparatus for measuring a winding angle of a carbon fiber being wound on a base material and a method of measuring the winding angle.

2. Description of Related Art

As a method of manufacturing a high pressure fluid tank, a so-called filament winding method (hereinafter, referred to as a "FW method") including winding a carbon fiber obtained by previously impregnating a liner serving as a base material of a tank with a thermosetting resin or an ultraviolet-curing resin to multiple plies and then curing the carbon fiber using heat or ultraviolet light, and forming a fiber-reinforced resin layer having high strength on a surface layer of the liner may be used. In addition, as a type of winding for the carbon fiber, hoop winding in which a carbon fiber is wound substantially perpendicularly to an axis of a liner and helical winding in which a carbon fiber is wound on the liner in a helical shape are known. In helical winding, a carbon fiber is wound to form various predetermined angles with respect to an axis of the liner. When the FW method is used, in order to obtain a desired strength, the carbon fiber needs to be wound at a predetermined angle with respect to the liner. Here, a technology of imaging the liner in a state in which the carbon fiber is being wound using a CCD camera, specifying a winding angle of the carbon fiber from the obtained image and determining whether the carbon fiber is being wound at an appropriate angle has been proposed (see Japanese Patent Application Publication No. 2014-233852 (JP 2014-233852 A)). Further, in relation to a carbon fiber or a paper fiber, various technologies for measuring a thickness of the fiber of a product (a sheet-shaped product such as paper or the like), in which these are used, or an orientation of the fiber have been proposed (see Japanese Patent Application Publication No. H11-269790 (JP H11-269790 A) and Japanese Patent Application Publication No. 2013-160745 (JP 2013-160745 A)).

SUMMARY

When a carbon fiber being wound on a liner is imaged by a CCD camera, a portion for identifying the winding angle may be projected as a dark section, and the winding angle may not be able to be precisely specified from the captured image. The inventor(s) has obtained the knowledge at the end of intensive research that projection of the dark section may be caused by the fact that since light is reflected in a direction perpendicular to the winding angle when light is radiated to the carbon fiber, the reflected light may not be able to be received when the CCD camera is disposed in a direction different from the direction. In the technology disclosed in JP 2014-233852 A, since imaging conditions such as a position of illumination, a position of the CCD camera, or the like, are not specifically disclosed, the above-mentioned problems can naturally occur. Such problems are not limited only to the above-mentioned liner but are shared by cases in which the carbon fiber is wound on an arbitrary base material. For this reason, a technology capable of precisely specifying the winding angle of the carbon fiber in the base material is desired.

The present disclosure is provided to solve at least one of the above-mentioned problems, and may be realized as the following aspects.

A first aspect of the present disclosure relates to a measuring apparatus for measuring a winding angle of a carbon fiber wound on a base material with respect to the base material. The measuring apparatus includes: a light source configured to radiate light to a target region on the base material serving as a measuring target for the winding angle; a diffusion plate configured to suppress linear transmission of reflected light from the target region and form an image constituted by the reflected light; an imaging device configured to capture the image formed by the diffusion plate to obtain a captured image; and a winding angle calculation unit configured to calculate an angle formed between a direction perpendicular to a longitudinal direction of the image constituted by the reflected light in the captured image and a reference direction in the base material as the winding angle.

According to the first aspect, since the image constituted by the reflected light from the target region is imaged while being formed by the diffusion plate and the angle formed between the direction perpendicular to the longitudinal direction of the image constituted by the reflected light in the obtained captured image and the reference direction in the base material is calculated as the winding angle, the winding angle of the carbon fiber in the target region can be precisely specified. This is because the carbon fiber has properties in which the reflected light spreads widely in the direction perpendicular to the direction of the fiber (the winding direction of the fiber) when light is radiated, and hardly any of the reflected light spreads in the direction of the fiber. In addition, since the image is formed by the diffusion plate, for example, even when a distance between the target region and the imaging device is varied when the winding angle is measured using a plurality of target regions as targets, the winding angle can be precisely specified because the longitudinal direction can be precisely specified while causing a variation in the width of the formed image. In addition, for example, even when the distance between the target region and the imaging device is different from a preset distance when the winding angle is measured using a single target region as a target, the longitudinal direction can be precisely specified in a state in which the width of the formed image is different from a previously determined width, and the winding angle can be precisely specified. In addition, since the image is formed by the diffusion plate, even when a mechanism configured to focus the target region, for example, a mechanism configured to vary a distance between the imaging device and the target region, or various optical systems are not provided, the longitudinal direction of the image can be precisely specified. For this reason, an increase in size and cost of the measuring apparatus can be minimized while the winding angle can be easily specified.

A second aspect of the present disclosure relates to a measuring apparatus for measuring a winding angle of a carbon fiber wound on a base material with respect to the base material. The measuring apparatus includes a light source unit configured to sequentially radiate light to a target region from a plurality of positions, the plurality of positions surrounding the target region on the base material serving as a measuring target for the winding angle and spaced a predetermined distance from the target region; a light receiving unit configured to receive reflected light from the target region and measure a quantity of light of the reflected light; and a winding angle calculation unit configured to calculate an angle formed between a direction perpendicular, on the target region, to a radiation direction of radiation light from the light source unit corresponding to the reflected light having a measured quantity of light that is a predetermined value or more and a reference direction in the base material as the winding angle.

According to the second aspect, since the light is sequentially radiated to the target region from the plurality of positions surrounding the target region and spaced a predetermined distance from the target region, when the light is radiated from any position, the reflected light is directed toward the light receiving unit, a probability of receiving light in the light receiving unit can be increased, and the winding angle can be specified. In addition, since the angle formed between the direction perpendicular to the radiation direction of the radiation light corresponding to the reflected light having the quantity of light that is a predetermined value or more on the target region and the reference direction in the base material is calculated as the winding angle, the winding angle of the carbon fiber in the target region can be precisely specified. This is because the carbon fiber has properties in which the reflected light spreads widely in the direction perpendicular to the direction of the fiber (the winding direction of the fiber) when the light is radiated, and hardly any of the reflected light spreads in the direction of the fiber. In addition, since the light is sequentially radiated to the target region from the plurality of positions surrounding the target region and spaced a predetermined distance from the target region, the radiation direction of the radiation light corresponding to the reflected light having the quantity of light that is a predetermined value or more can be precisely specified.

In the second aspect, the light source unit may have a plurality of light sources disposed at the plurality of positions, respectively; and an illumination control unit configured to sequentially radiate light from the plurality of light sources to the target region. According to the aspect, since the light is sequentially radiated to the target region from the plurality of light sources disposed at the plurality of positions, respectively, the radiation angle of the light with respect to the target region can be easily varied. In addition, since there is no mechanical mechanism configured to vary the radiation angle of the light with respect to the target region, reduction in size or cost of the measuring apparatus can be achieved.

In the above-mentioned second aspect, the light source unit may have a light source configured to radiate light from an arbitrary position to the target region, the arbitrary position surrounding the target region and spaced a predetermined distance from the target region; a cylindrical light shielding unit rotatably disposed along the light sources between the light sources and the target region, and in which a slit is formed; and a rotation control unit configured to control rotation of the light shielding unit such that a position of the slit becomes a position corresponding to the plurality of positions. According to the aspect, since rotation of the light shielding unit is controlled such that a position of the slit is a position corresponding to the plurality of positions, the radiation angle of the light with respect to the target region can be easily varied. In addition, since the radiation angle is varied as the light shielding unit is rotated, the radiation angle can be continuously varied. For this reason, the radiation direction of the radiation light corresponding to the reflected light having the quantity of light that is a predetermined value or more can be more precisely specified.

A third aspect of the present disclosure relates to a measuring apparatus for measuring a winding angle of a carbon fiber wound on a base material with respect to the base material. The measuring apparatus includes a light source configured to radiate light to a target region on the base material serving as a measuring target for the winding angle; a light receiving unit configured to receive reflected light from the target region and measure a quantity of light of the reflected light at a plurality of positions, the plurality of positions surrounding the target region and spaced a predetermined distance from the target region; and a winding angle calculation unit configured to calculate an angle formed between a direction perpendicular, on the target region, to a direction of the reflected light having a measured quantity of light that is a predetermined value or more and a reference direction in the base material as the winding angle.

According to the third aspect, since the light receiving unit configured to receive the reflected light from the target region and measure the quantity of light of the reflected light at the plurality of positions surrounding the target region and spaced a predetermined distance from the target region is provided, a probability of receiving the reflected light and measuring the quantity of light at any position can be increased, and the winding angle can be specified. In addition, since the angle formed between the direction perpendicular to the direction of the reflected light having the quantity of light of the reflected light from the target region that is a predetermined value or more on the target region and the reference direction in the base material is calculated as the winding angle, the winding angle of the carbon fiber in the target region can be precisely specified. This is because the carbon fiber has properties in which the reflected light spreads widely in the direction perpendicular to the direction of the fiber (the winding direction of the fiber) when the light is radiated, and hardly any of the reflected light spreads in the direction of the fiber. In addition, since the reflected light from the target region is received and the quantity of light of the reflected light is measured at the plurality of positions surrounding the target region and spaced a predetermined distance from the target region, the direction of the reflected light having the quantity of light that is a predetermined value or more can be precisely specified.

In the third aspect, the light receiving unit may include a plurality of photoelectric devices disposed at the plurality of positions, respectively; and a light receiving amount measuring unit configured to specify the quantity of light from a magnitude of current output from the plurality of photoelectric devices. According to the aspect, since there are the plurality of photoelectric devices disposed at the plurality of positions, respectively, and the light receiving amount measuring unit configured to specify the quantity of light of the reflected light from the magnitude of the current output from the plurality of photoelectric devices, the quantity of light of the reflected light can be precisely measured.

In the first to third aspects, a scanning unit configured to switch the target region by moving at least one of the base material and the measuring apparatus to relatively move the measuring apparatus with respect to the base material; and a width calculation unit configured to calculate a width of a region in which the carbon fiber is being wound at a single winding angle using a distance between both ends of a plurality of target regions arranged in a direction of relatively moving the measuring apparatus with respect to the base material and in which the calculated winding angles coincide with each other and the winding angle may be further provided. According to the aspect, the width of the region on which the carbon fiber is being wound at the single winding angle can be specified. In addition, since the width of the region in which the carbon fiber is wound at the single winding angle can be precisely specified using the distance between both ends of the plurality of target regions arranged in the relative movement direction with respect to the base material of the measuring apparatus and in which the winding angles coincide with each other and the winding angle, the width can be precisely specified. In addition, since radiation of the light to the carbon fiber again or specification of the radiation direction or the reflection direction can be omitted from separate measurement of the winding angle to measure the width, a total time of a measurement time of the winding angle and a specifying time of the width of the region in which the carbon fiber is wound at a single winding angle can be reduced.

In the first to third aspects, the base material may be a liner for a tank. According to the aspect, the winding angle of the carbon fiber wound on the liner for a tank can be precisely specified. Accordingly, a quality of the winding of the carbon fiber using the specified winding angle can be determined, and strength of the completed tank can be estimated.

A fourth aspect of the present disclosure relates to a method of measuring a winding angle of a carbon fiber wound on a base material with respect to the base material. The measuring method includes radiating light to a target region on the base material serving as a measuring target for the winding angle; forming an image constituted by reflected light from the target region using a diffusion plate; imaging the image formed by the diffusion plate and obtaining a captured image; and calculating an angle formed between a direction perpendicular to a longitudinal direction of the image constituted by the reflected light in the captured image and a reference direction in the base material as the winding angle.

A fifth aspect of the present disclosure relates to a method of measuring a winding angle of a carbon fiber wound on a base material with respect to the base material. The measuring method includes sequentially radiating light from a plurality of positions surrounding a target region on the base material serving as a measuring target for the winding angle and spaced a predetermined distance from the target region to the target region; receiving reflected light from the target region and measuring a quantity of light of the reflected light; and calculating an angle formed between a direction perpendicular, on the target region, to a radiation direction of radiation light corresponding to the reflected light having a measured quantity of light that is a predetermined value or more and a reference direction in the base material as the winding angle.

A sixth aspect of the present disclosure relates to a method of measuring a winding angle of a carbon fiber wound on a base material with respect to the base material. The measuring method includes radiating light to a target region on the base material serving as a measuring target for the winding angle; receiving reflected light from the target region and measuring a quantity of light of the reflected light at a plurality of positions surrounding the target region and spaced a predetermined distance from the target region; and calculating an angle formed between a direction perpendicular, on the target region, to a direction of the reflected light having a measured quantity of light that is a predetermined value or more and a reference direction in the base material as the winding angle.

The present disclosure may realize various aspects. For example, the present disclosure may be realized in aspects such as a method of measuring a winding angle, a method of manufacturing a tank, a computer program configured to measure a winding angle, a recording medium configured to store the computer program, or the like.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A. First Embodiment

Figure 1:
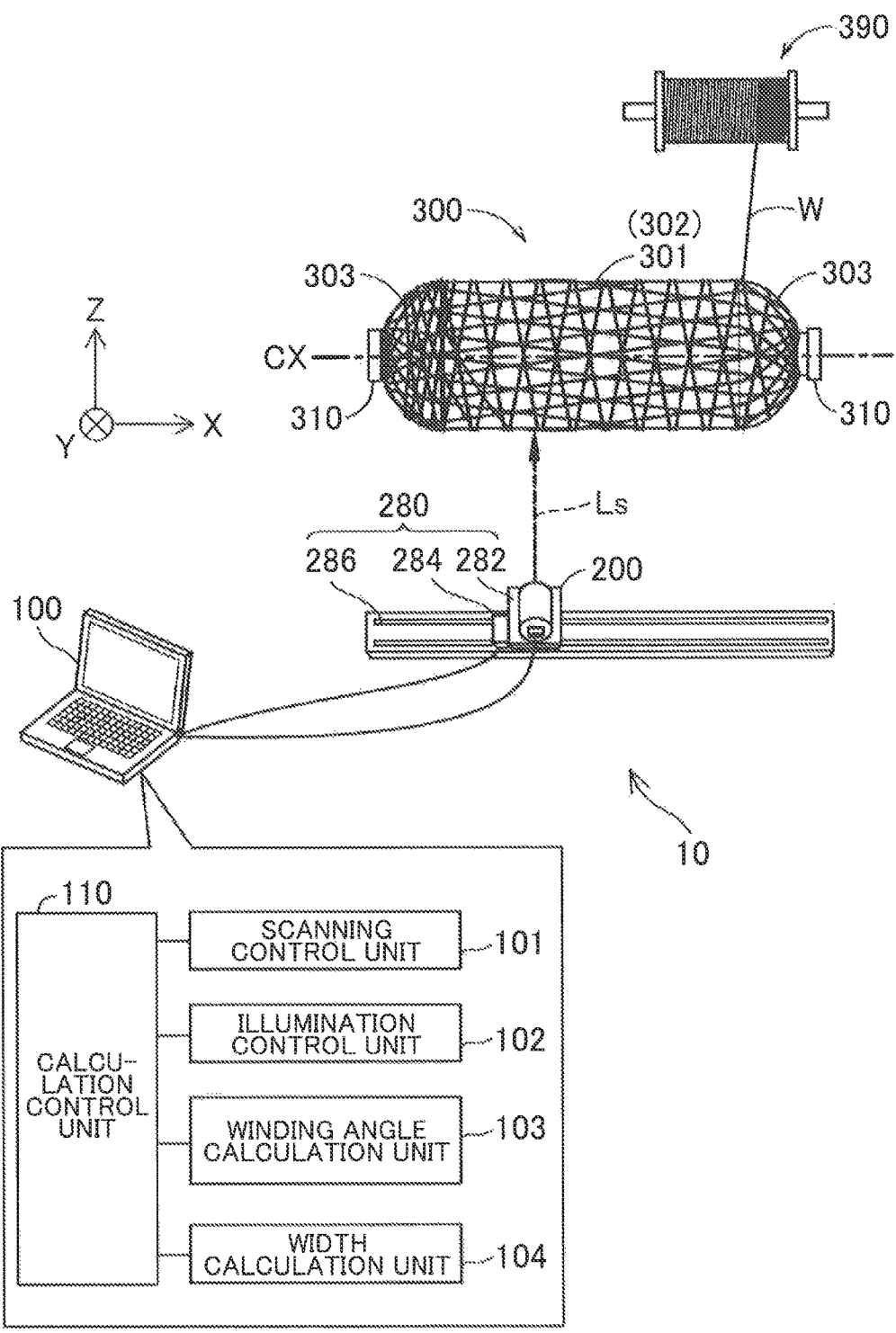
FIG. 1 is a view for describing a schematic configuration of a measuring apparatus according to an embodiment of the present disclosure.

A1. Apparatus Configuration:

FIG. 1 is a view for describing a schematic configuration of a measuring apparatus according to an embodiment of the present disclosure. In FIG. 1, in addition to a measuring apparatus 10, a tank 300 during manufacture, a carbon fiber W wound on a liner 301 which is a base material of the tank 300 and a bobbin 390 configured to supply the carbon fiber W are shown. Further, in FIG. 1, in order to specify a posture of the liner 301, X-, Y- and Z-axes, which are perpendicular to each other, are also shown. The Z-axis is parallel to a vertical direction, and the X-axis and the Y-axis are parallel to a horizontal direction. The measuring apparatus 10 measures a winding angle of the carbon fiber W wound on the liner 301.

In the embodiment, the tank 300 is a tank configured to store a high pressure fluid such as high pressure hydrogen gas or the like, and includes the liner 301 and two mouth ring sections 310 installed at both end portions in a longitudinal direction of the liner 301. The liner 301 constitutes an inner shell of the tank 300. In the embodiment, the liner 301 is formed of low density polyethylene (LPDE). Further, the liner 301 may be formed of another resin material or metal material such as high density polyethylene (HDPE), linear low density polyethylene (L-LDPE), and so on, instead of low density polyethylene. The liner 301 includes a cylindrical section 302 and two dome sections 303 extending to both ends of the cylindrical section 302. The cylindrical section 302 has a cylindrical appearance. An axis of the cylindrical section 302 coincides with an axis CX of the liner 301 and an axis of the tank 300. In FIG. 1, the axis CX is parallel to the X-axis. Each of the two dome sections 303 has a dome-shaped appearance, and the mouth ring section 310 is disposed at an apex thereof. The mouth ring sections 310 are used to attach a pipeline or a valve. In the tank 300 after completion, a reinforced layer constituted by the carbon fiber W is formed on an outer surface of the liner 301. The reinforced layer is formed by winding the carbon fiber W supplied from the bobbin 390 on the outer surface of the liner 301 by winding processing, which will be described below, and heating the wound carbon fiber W.

The carbon fiber W is configured by binding a plurality of (for example, twenty thousand) single fibers having a diameter of about several μm (micrometers) and formed of carbon. Directions of the single fibers of the carbon fiber W are substantially parallel to each other. Accordingly, a direction (a winding direction) of the carbon fiber W substantially coincides with the directions of the single fibers. Each of the single fibers is impregnated with a thermosetting resin. In the embodiment, an epoxy resin is used as the thermosetting resin. In addition, in the embodiment, a polyacrylonitrile (PAN)-based carbon fiber is used as the single fiber. Further, another arbitrary kind of carbon fiber such as a rayon-based carbon fiber, a pitch-based carbon fiber, or the like, may also be used instead of a polyacrylonitrile (PAN)-based carbon fiber. In addition, each of the single fibers may be impregnated with an ultraviolet-curing resin instead of a thermosetting resin. Since each of the single fibers that constitute the carbon fiber W is impregnated with the thermosetting resin as described above, the surface of the carbon fiber W is glossy, and light is reflected when the surface is irradiated with light.

In the embodiment, helical winding and hoop winding are used as a method of winding the carbon fiber W onto the liner 301. In helical winding, the carbon fiber W is wound in a helical shape throughout the liner 301. In hoop winding, the carbon fiber W is wound on the cylindrical section 302 of the liner 301. A layer of a plurality of carbon fibers W is formed on the liner 301 by the helical winding and the hoop winding.

The measuring apparatus 10 measures a winding angle of the carbon fiber W wound on the liner 301. As described below, in the embodiment, the measuring apparatus 10 measures a winding angle of the carbon fiber W whenever a layer of the carbon fiber W is formed to an extent of one layer by helical winding. In the embodiment, the winding angle is an angle of the carbon fiber W with respect to the axis CX of the liner 301. More specifically, the winding angle is an angle between a projected line, when the carbon fiber W is projected to a virtual plane substantially parallel to a target region serving as a measuring target for the winding angle in the virtual plane including the axis CX, and the axis CX. The measuring apparatus 10 includes a scanning unit 280, a reflected light imaging unit 200 and a control device 100.

Figure 2:
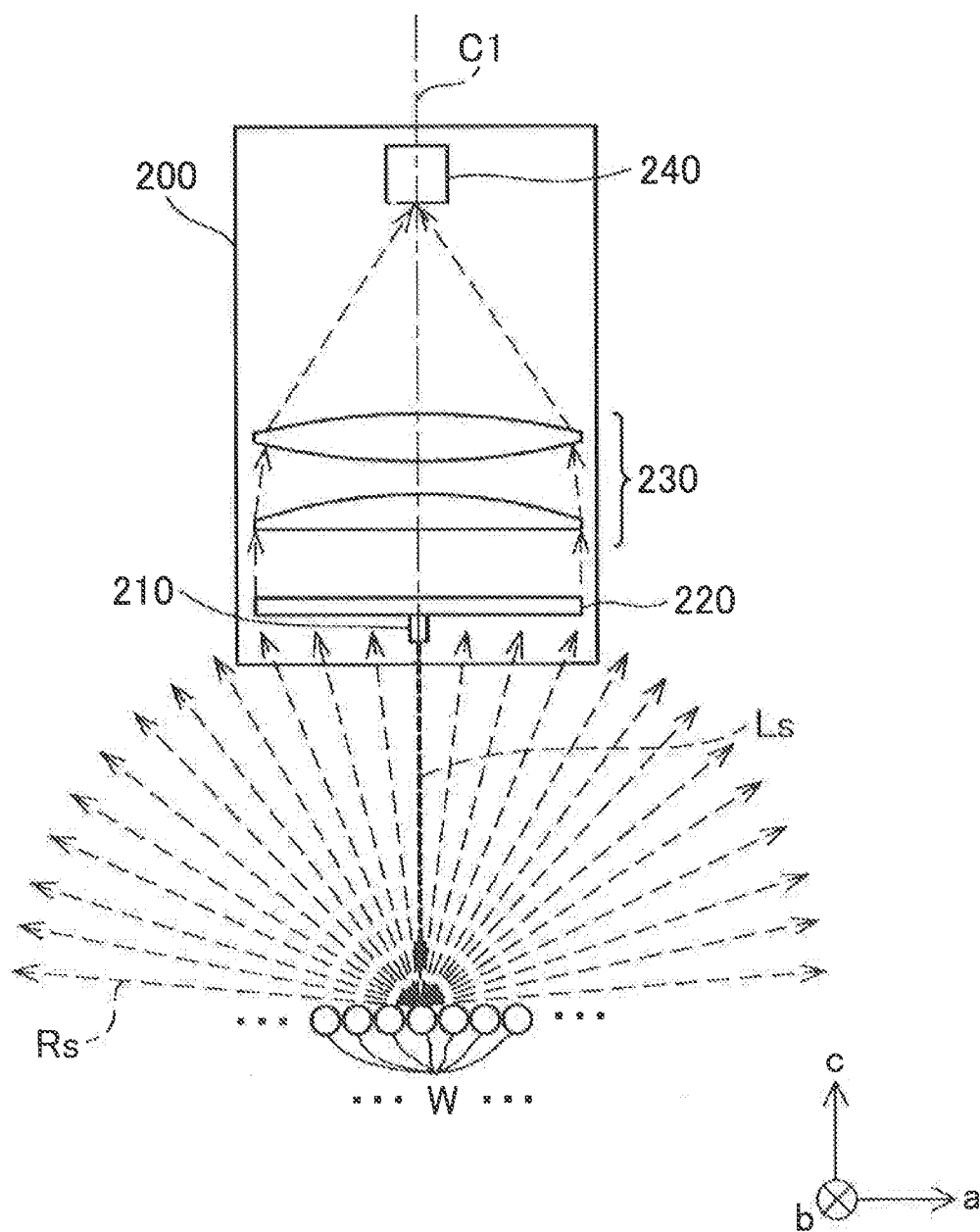
FIG. 2 is a first view for describing a schematic configuration of a reflected light imaging unit.
Figure 3:
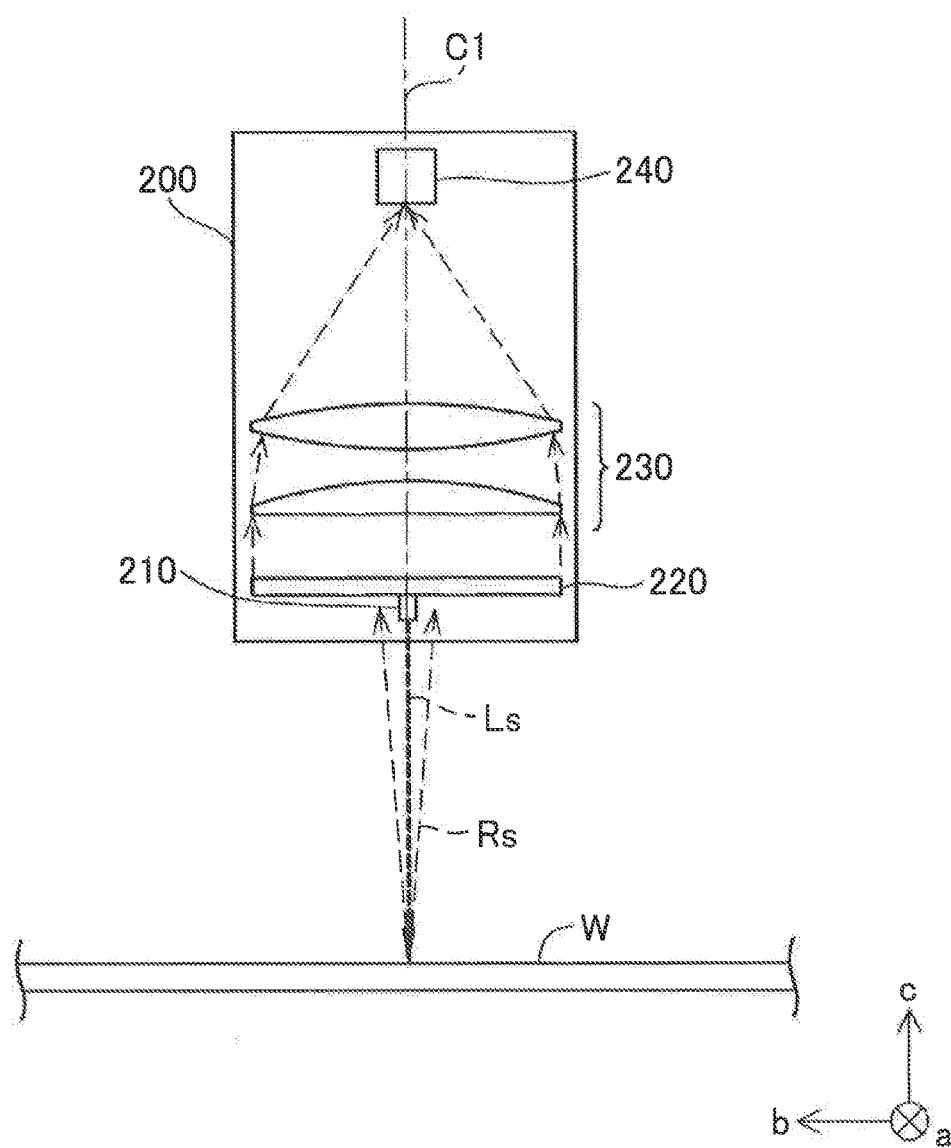
FIG. 3 is a second view for describing a schematic configuration of the reflected light imaging unit.

FIG. 2 is a first view for describing a schematic configuration of the reflected light imaging unit 200. FIG. 3 is a second view for describing a schematic configuration of the reflected light imaging unit 200. FIG. 2 and FIG. 3 show a configuration of the reflected light imaging unit 200 when seen from different directions. In FIG. 2 and FIG. 3, a-, b- and c-axes perpendicular to each other are shown such that correspondence between the directions (the winding directions) of the carbon fiber W in the drawings can be easily understood. Further, the a-, b- and c-axes are different from the X-, Y- and Z-axes of FIG. 1. The reflected light imaging unit 200 emits a laser beam Ls, receives reflected light Rs thereof and captures an image formed of the reflected light Rs to obtain a captured image. Further, in FIG. 2 and FIG. 3, the carbon fiber W wound on the liner 301 is schematically shown together with the reflected light imaging unit 200. In FIG. 2 and FIG. 3, the direction (the winding direction) of the carbon fiber W is parallel to the b-axis direction.

The reflected light imaging unit 200 includes a laser light source 210, a diffusion plate 220, a condensing lens group 230 and an imaging device 240. In the embodiment, the laser light source 210 is constituted by a semiconductor laser element and emits a laser beam having a predetermined wavelength. As the laser beam, for example, a red laser beam having a wavelength of 635 nm (nanometers), a green laser beam having a wavelength of 532 nm, or the like, is used. In addition, the laser light source 210 is constituted by an array having a plurality of semiconductor laser elements, and in the embodiment, a diameter of the emitted laser beam is set to about 1/10 of the diameter of the carbon fiber W. Further, the diameter of the laser beam is not limited to about 1/10 of the carbon fiber W and may be set to an arbitrary size smaller than a width of a fiber band section, which will be described below.

When the laser beam Ls is radiated to the carbon fiber W, as shown in FIG. 2, the reflected light Rs is spread in a wide range about a radiation position of the laser beam Ls when the carbon fiber W is seen in the winding direction (the b-axis direction) of the carbon fiber W. This is because a reflection direction varies greatly due to small differences in radiation position of the laser beam Ls since both of a contour of a cross section in a radial direction of the carbon fiber W and a contour of an end surface in a radial direction of each of the single fibers that constitute the carbon fiber W are substantially circular.

Meanwhile, as shown in FIG. 3, when the carbon fiber W is seen in the direction (the a-axis direction) perpendicular to the winding direction of the carbon fiber W, in other words, when seen in the direction perpendicular to the longitudinal direction of the carbon fiber W, the reflected light Rs is collected in an extremely narrow range about the radiation position of the laser beam Ls in comparison with the case when seen in the direction shown in FIG. 2. When seen in the direction perpendicular to the winding direction of the carbon fiber W, since a portion of the carbon fiber W (each of the single fibers) to which the laser beam Ls is radiated is a substantially linear shape, differences in the reflection direction due to small differences in radiation position of the laser beam Ls are reduced. Due to a property of expansion of the reflected light Rs in the carbon fiber W (single fiber), when seen in the radiation direction of the laser beam Ls, the reflected light Rs is detected as linear light extending in the direction perpendicular to the winding direction of the carbon fiber W.

As shown in FIG. 2 and FIG. 3, the diffusion plate 220 has a substantially disk-shaped translucent appearance. The laser light source 210 is disposed at a central section of the diffusion plate 220. The reflected light Rs from the carbon fiber W enters the diffusion plate 220. The diffusion plate 220 forms an image constituted by the reflected light Rs while suppressing linear transmission of the reflected light Rs that enters the diffusion plate 220. The image is formed as a band-shaped bright image.

The condensing lens group 230 collects light representing an image formed by the diffusion plate 220 at a predetermined region in the imaging device 240. The imaging device 240 has a two-dimensional image sensor constituted by an imaging element. As the image sensor, a CCD image sensor or a CMOS image sensor may also be used. The imaging device 240 captures an image formed by the diffusion plate 220 to obtain a captured image using the image sensor. The laser light source 210, the diffusion plate 220, the condensing lens group 230 and the imaging device 240 that constitute the reflected light imaging unit 200 are disposed to have an optical axis C1 that is common therebetween. As shown in FIG. 1, the reflected light imaging unit 200 is electrically connected to the control device 100, and data of the captured image obtained by the reflected light imaging unit 200 is transmitted to the control device 100.

As shown in FIG. 1, the scanning unit 280 includes a base section 282, a scanning drive unit 284 and rails 286. The scanning unit 280 performs scanning in a direction parallel to the axis CX using the reflected light imaging unit 200. The base section 282 has a plate-shaped appearance, is provided with an upper surface to which the reflected light imaging unit 200 is fixed and a lower surface to which wheels (not shown) are attached, and is configured to be movable along the rails 286. The reflected light imaging unit 200 is fixed to an upper surface of the base section 282 such that an optical axis of the reflected light imaging unit 200 is perpendicular to the axis CX. The scanning drive unit 284 includes a drive motor (not shown), and drives the wheels of the base section 282. The scanning drive unit 284 is electrically connected to the control device 100, and moves the reflected light imaging unit 200 along the rails 286 by driving the wheels of the base section 282 according to an instruction from the control device 100.

The control device 100 controls the entire measuring apparatus 10. In the embodiment, the control device 100 is constituted by a computer. A CPU of the control device 100 functions as a calculation control unit 110, a scanning control unit 101, an illumination control unit 102, a winding angle calculation unit 103 and a width calculation unit 104 when control programs previously stored in a memory are executed. The calculation control unit 110 controls the scanning control unit 101, the illumination control unit 102, the winding angle calculation unit 103 and the width calculation unit 104 such that they calculate a winding angle, and cooperate with a fiber winding apparatus (not shown) to perform fiber winding processing, which will be described below.

The scanning control unit 101 controls scanning of the scanning unit 280. In addition, the scanning control unit 101 specifies a radiation position of the laser beam Ls based on a signal from a position sensor (not shown) provided in the scanning drive unit 284. The illumination control unit 102 controls radiation of the laser beam Ls from the laser light source 210. The winding angle calculation unit 103 calculates a winding angle using a captured image received from the reflected light imaging unit 200 (the imaging device 240). The width calculation unit 104 calculates a width of a band-shaped group (hereinafter, referred to as "a fiber band section") of neighboring carbon fibers W serving as an aggregation of carbon fibers W having substantially the same winding angle in the fiber winding processing, which will be described below. The above-mentioned "width" is a length in the direction perpendicular to the winding direction of the carbon fiber W.

The measuring apparatus 10 measures a winding angle in the middle of winding of the carbon fiber W onto the liner 301 in the fiber winding processing, which will be described below. More specifically, whenever a layer formed of the carbon fiber W is performed by helical winding, a winding angle at a predetermined measurement position of the layer is measured. In the embodiment, a plurality of predetermined measurement positions are previously set on the liner 301 along the axis CX. Further, hereinbelow, a region on the liner 301 including a predetermined measurement position and serving as a measuring target of a winding angle is referred to as "a target region."

The above-mentioned liner 301 corresponds to a subordinate concept of a base material in the following claims. In addition, the laser light source 210 corresponds to a light source in the following claims.

Figure 4:
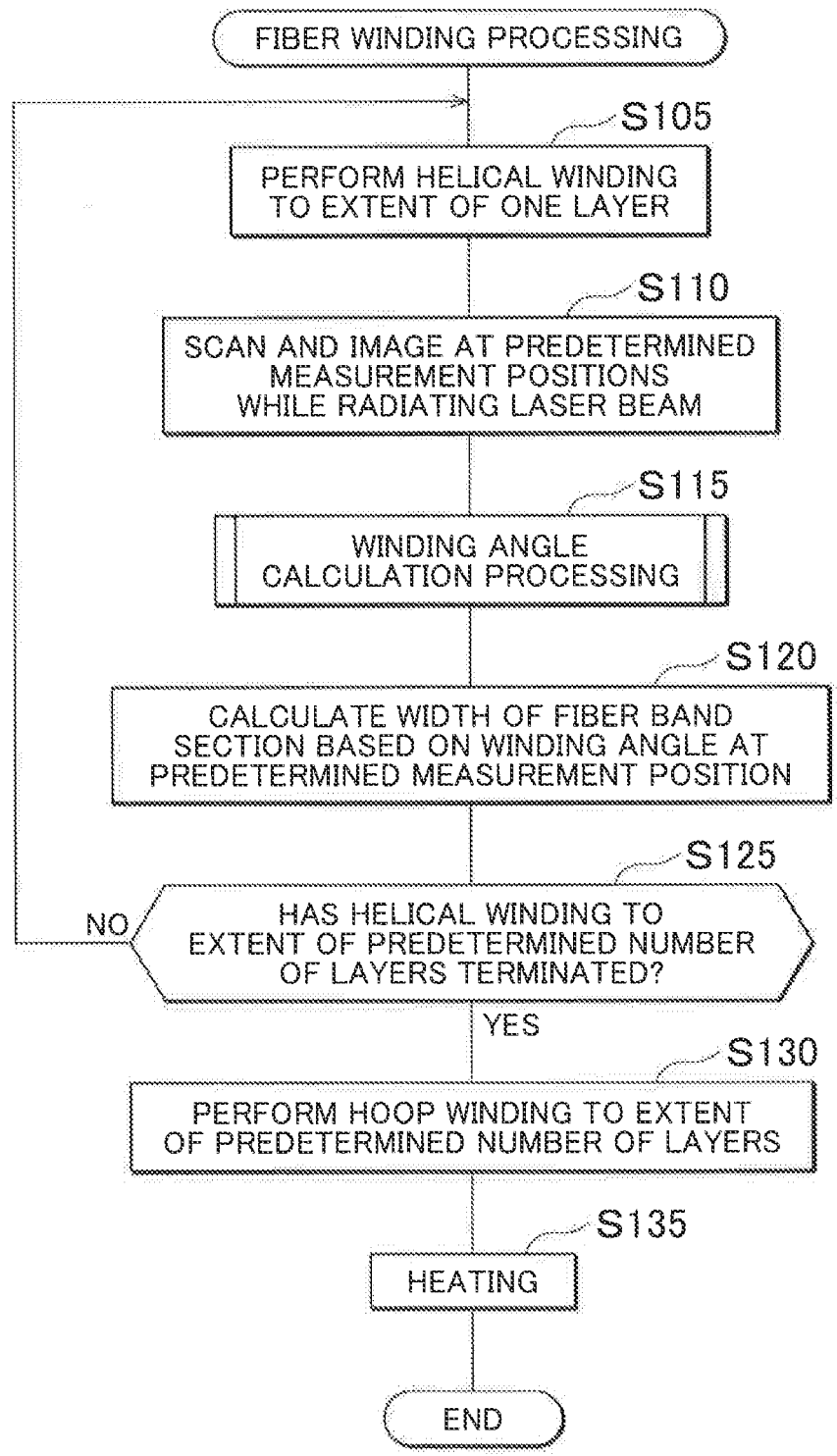
FIG. 4 is a flowchart showing a procedure of fiber winding processing according to a first embodiment.

A2. Fiber Winding Processing:

FIG. 4 is a flowchart showing a procedure of fiber winding processing according to the first embodiment. When a user sets the liner 301 on the fiber winding apparatus (not shown) and operates an operation panel of the apparatus to instruct starting of the winding of the carbon fiber W, and selects a menu item to measure a winding angle from an operation menu to execute the menu item in the control device 100, the fiber winding processing is started by the fiber winding apparatus (not shown) and the control device 100.

The fiber winding apparatus (not shown) performs helical winding on the surface of the liner 301 for one layer using the carbon fiber W delivered from the bobbin 390 (step S105). The control device 100 performs scanning using the reflected light imaging unit 200 while radiating a laser beam to the carbon fiber W wound on the surface of the liner 301, and performs imaging at predetermined measurement positions (step S110). Here, the scanning control unit 101 controls the scanning drive unit 284 and scans the reflected light imaging unit 200 and the scanning unit 280 along the rails 286. Layers of the carbon fibers W formed through the helical winding are constituted by a plurality of fiber band sections, and at least one predetermined measurement position is set for each of the fiber band sections. In the embodiment, the predetermined measurement positions are set to be parallel to the axis CX at substantially predetermined intervals. In addition, disposition positions in a height direction (the Z-axis direction) of the reflected light imaging unit 200 and the scanning unit 280 are previously set such that a laser beam is radiated to the predetermined measurement positions. A captured image including a target region at the predetermined measurement positions is obtained by step S110.

The winding angle calculation unit 103 performs winding angle calculation processing (step S115).

Figure 5:
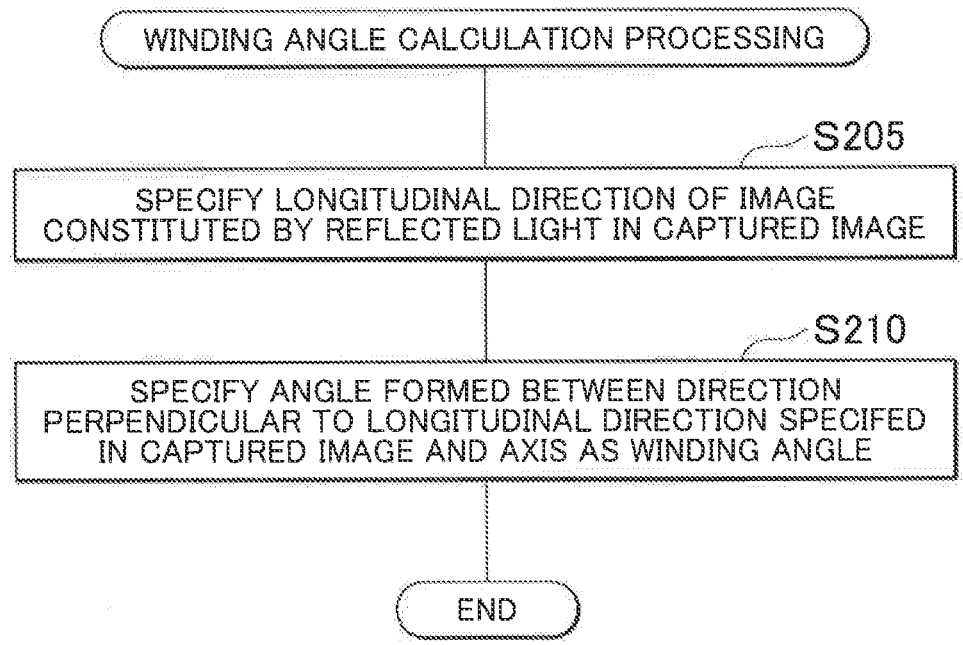
FIG. 5 is a flowchart showing a detailed procedure of winding angle calculation processing.

FIG. 5 is a flowchart showing a detailed procedure of the winding angle calculation processing. The winding angle calculation unit 103 specifies a longitudinal direction of an image constituted by the reflected light in the captured images (step S205). The winding angle calculation unit 103 specifies an angle between the direction perpendicular to the specified longitudinal direction and the axis CX as the winding angle in the imaging devices (step S210).

Figure 6:
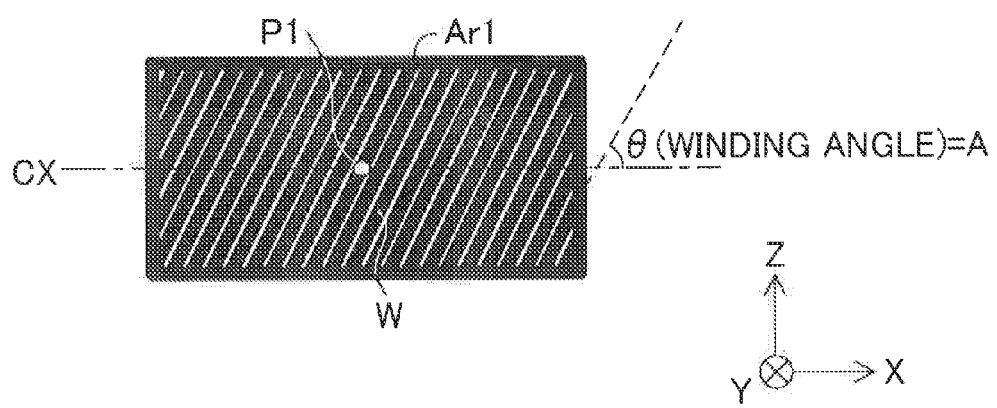
FIG. 6 is a plan view showing an example of a winding situation of a carbon fiber on a liner.

FIG. 6 is a plan view showing an example of a winding situation of the carbon fiber W on the liner 301. In FIG. 6, a winding situation of the carbon fiber W in a region Ar1 which is a portion of the liner 301 is schematically shown. In the region Ar1, the carbon fiber W is wound on the liner 301 at a winding angle θ as an angle A. Further, in FIG. 6, like FIG. 1, the X-, Y- and Z-axes are shown. A predetermined measurement position P1 is included in the region Ar1 at a center thereof. In the embodiment, the winding angle is an acute angle serving as an angle between the projected line on a right side of the drawing (a +X side) with respect to the predetermined measurement position and the axis CX, which means an angle between the projected line obtained by projecting the carbon fiber W to a virtual plane substantially parallel to the target region serving as a virtual plane including the axis CX and the axis CX. In addition, the angle is a positive angle when an intersection at which the acute angle is formed is disposed upward in the drawing (a +Z direction) with respect to the axis CX, and the angle is a negative angle when the intersection is disposed downward in the drawing (a –Z direction). In an example of FIG. 6, the winding angle θ is a positive angle.

Figure 7:
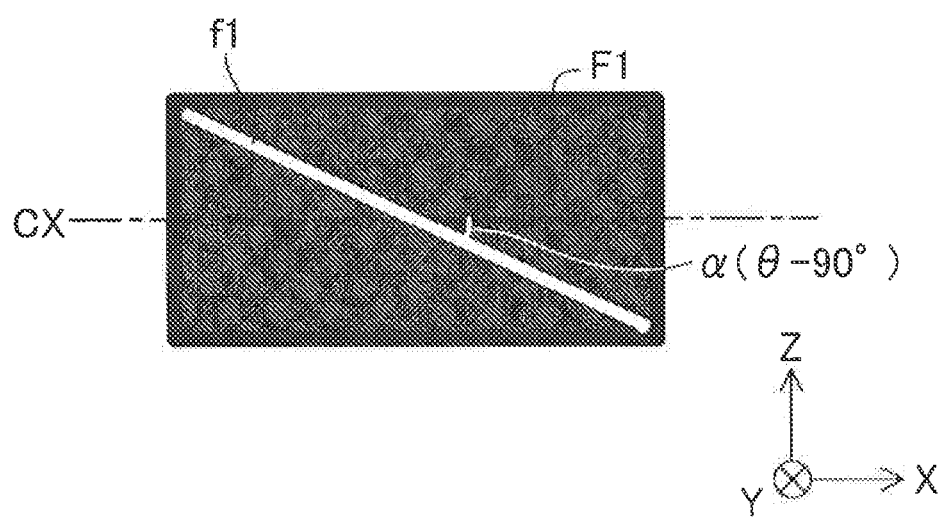
FIG. 7 is a view for describing an example of a captured image obtained by a reflected light imaging unit.

FIG. 7 is a view for describing an example of the captured image obtained by the reflected light imaging unit 200. In FIG. 7, a captured image F1 of the region Ar1 shown in FIG. 6 is represented. Further, in FIG. 7, together with the axis CX, like FIG. 1 and FIG. 6, the X-, Y- and Z-axes are represented.

As shown in FIG. 7, an image f1 having a band shape is projected to the captured image F1. The image f1 is formed by the reflected light from the target region including the predetermined measurement position P1. Since the reflected light is spread in the direction perpendicular to the winding angle θ and widened by the diffusion plate 220, the reflected light appears as the image f1 having the band shape as shown in FIG. 7. Accordingly, in the above-mentioned step S205, the longitudinal direction of the image f1, i.e., a direction that forms an angle α with the axis CX is specified. Further, the angle α is equal to "(the winding angle θ)–90°." In step S210, the angle (i.e., the angle θ) formed between the direction perpendicular to the longitudinal direction of the image f1 and the axis CX is specified as a winding angle. Also at another predetermined measurement position (not shown), the winding angle at which the same image as that of FIG. 7 is obtained is calculated. The calculated winding angle is stored in a memory provided in the control device 100 in association with the predetermined measurement position.

As shown in FIG. 4, the width calculation unit 104 calculates a width of each of the fiber band sections based on the winding angle of the predetermined measurement position (step S120).

Figure 8:
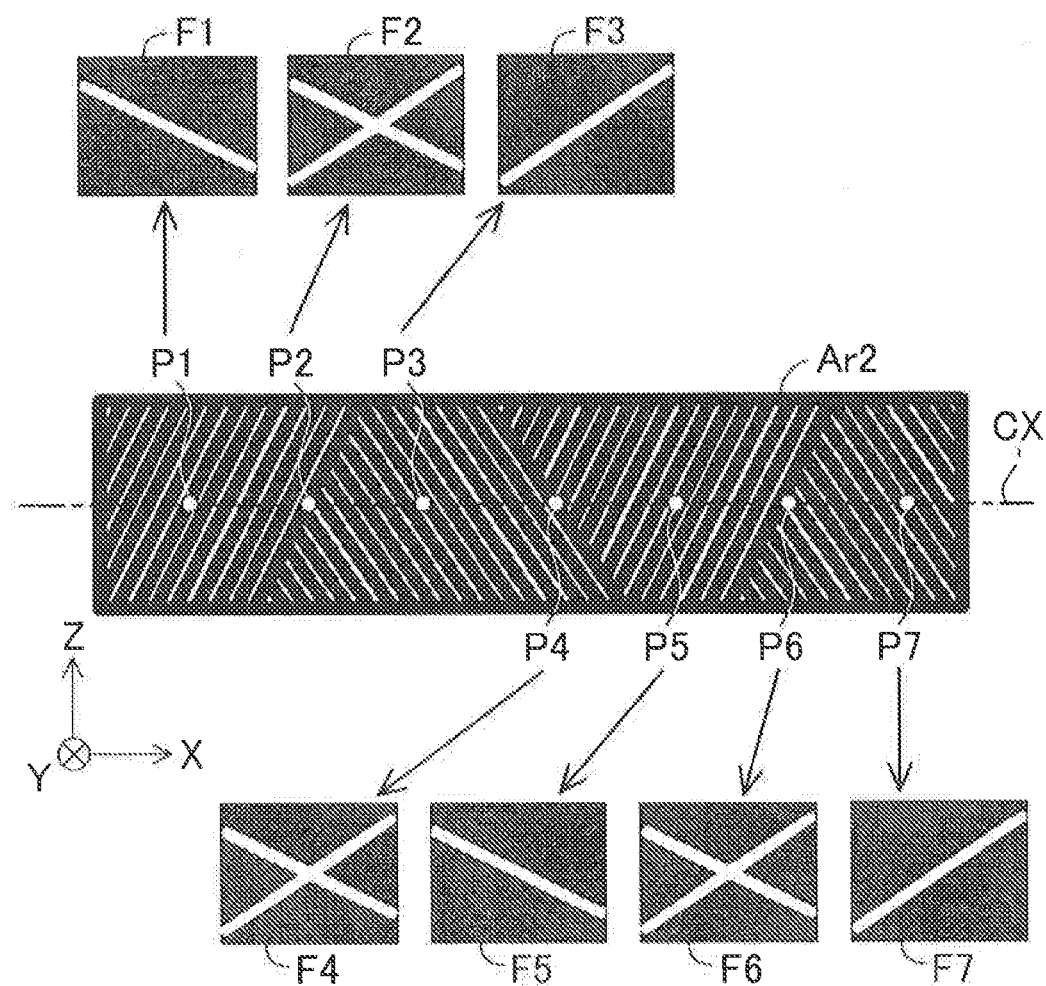
FIG. 8 is a view for describing a winding situation of a carbon fiber in a liner and captured images obtained at predetermined measurement positions.

FIG. 8 is a view for describing a winding situation of the carbon fiber W on the liner 301 and captured images obtained at predetermined measurement positions (a target region). In FIG. 8, the winding situation of the carbon fiber W in a region Ar2 which is a portion of the liner 301 is schematically shown. In addition, in FIG. 8, the captured images F1 to F7 obtained by scanning using the reflected light imaging unit 200 at the predetermined measurement positions are represented. A total of seven predetermined measurement positions (positions P1 to P7) are set in the region Ar2. Further, the predetermined measurement position P1 is equivalent to the predetermined measurement position P1 shown in FIG. 6. The captured image F1 is obtained at the predetermined measurement position P1. In addition, the captured image F2 is obtained at the predetermined measurement position P2, the captured image F3 is obtained at the predetermined measurement position P3, the captured image F4 is obtained at the predetermined measurement position P4, the captured image F5 is obtained at the predetermined measurement position P5, the captured image F6 is obtained at the predetermined measurement position P6, and the captured image F7 is obtained at the predetermined measurement position P7.

In the captured images F2, F4 and F6, two band-shaped images, which cross each other, are projected. Since the predetermined measurement positions P2, P4 and P6 are disposed at boundaries between the fiber band sections, which are immediately adjacent to each other, a total of two images constituted by the reflected light from the single fibers of the end portions of the fiber band sections are projected. Further, when the two band-shaped images are projected in this way, in the above-mentioned winding angle calculation processing (step S115), both of the winding angles obtained from the two images, i.e., the winding angles of the two neighboring fiber band sections are calculated.

Figure 9:
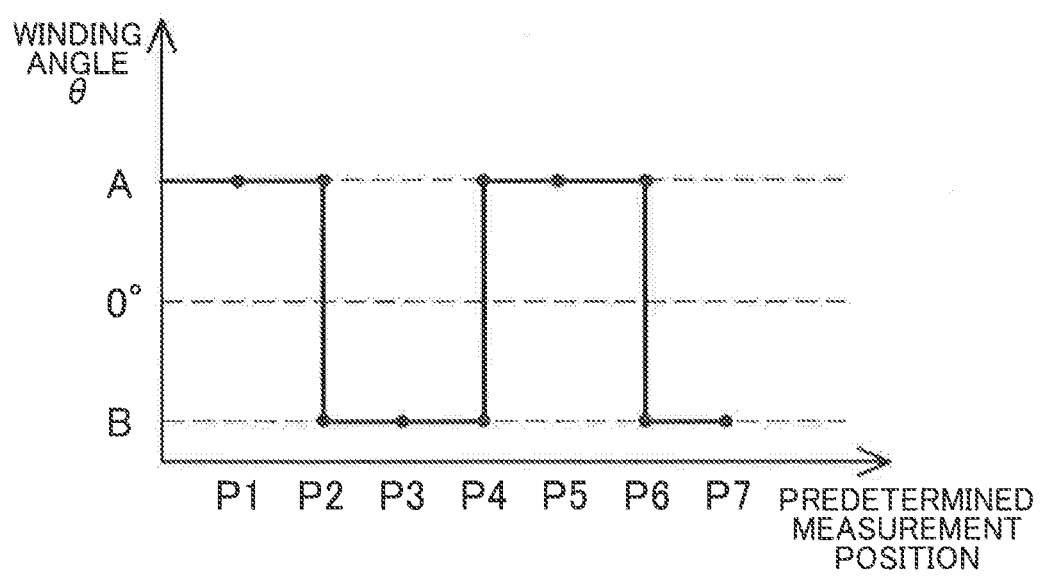
FIG. 9 is a view for describing winding angles calculated at the predetermined measurement positions.

FIG. 9 is a view for describing the winding angles θ calculated at the predetermined measurement positions. In FIG. 9, a horizontal axis shows the predetermined measurement positions, and a vertical axis shows the calculated winding angles θ. As shown in FIG. 9, the winding angles θ are the angles A at the predetermined measurement positions P1 and P5. In addition, the winding angles θ are angles B at the predetermined measurement positions P3 and P7. Further, the angle A has a positive value, and the angle B has a negative value. The winding angles at the predetermined measurement positions P2, P4 and P6 are the angle A and the angle B. The angle A is, for example, +30°, and the angle B is, for example, –30°.

Figure 10:
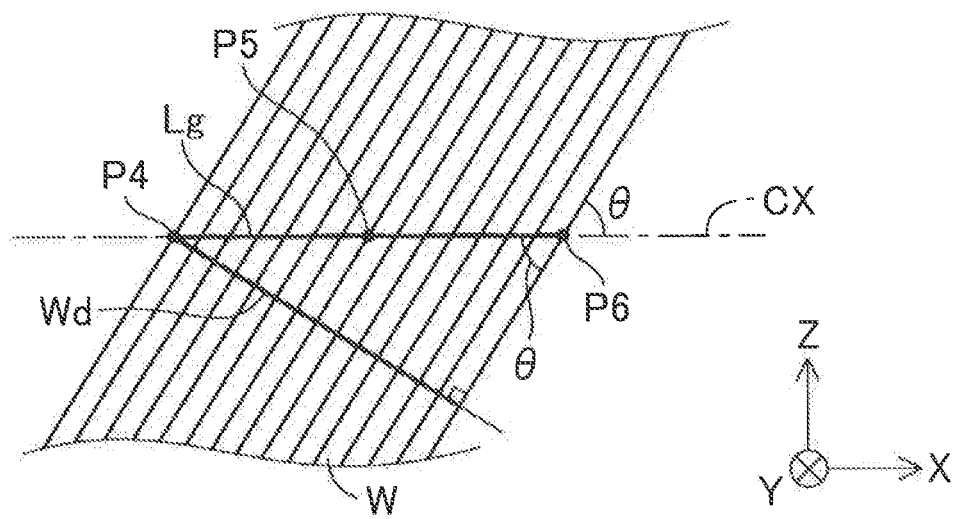
FIG. 10 is a view for schematically describing a method of calculating a width of a fiber band section.

FIG. 10 is a view for schematically describing a method of calculating a width of a fiber band section. In FIG. 10, the winding region (the fiber band section) of the carbon fiber W including the three predetermined measurement positions P4 to P6 is enlarged and shown.

In step S120, the width calculation unit 104 first specifies a plurality of predetermined measurement positions (hereinafter, referred to as "a predetermined measurement position group") at which the same winding angles are calculated and which are arranged consecutively. For example, as shown in FIG. 9, since both of the winding angles are calculated as the angle A at the three predetermined measurement positions P4 to P6, which are consecutively arranged, the three predetermined measurement positions P4 to P6 are specified as a predetermined measurement position group. Next, a length of the specified predetermined measurement position group in the direction perpendicular to the axis CX is specified. Since the predetermined measurement positions are predetermined, a distance between the predetermined measurement positions of both ends of the specified predetermined measurement position group is specified as a length in the direction parallel to the axis CX of the above-mentioned predetermined measurement position group. For example, as shown in FIG. 10, a distance between the predetermined measurement position P4 and the predetermined measurement position P6 is specified as a length Lg in the direction parallel to the axis CX of the predetermined measurement position group constituted by the predetermined measurement positions P4 to P6. Then, a width Wd of the predetermined measurement position group is calculated by the following equation (1).

$$Wd = Lg \times \sin\theta \tag{1}$$

Similarly, widths of the predetermined measurement position groups including the two predetermined measurement positions P1 and P2, the three predetermined measurement positions P2 to P4, and the two predetermined measurement positions P6 and P7, i.e., widths of the fiber band sections are calculated.

As shown in FIG. 4, when the widths of the fiber band sections are calculated, the fiber winding apparatus (not shown) determines whether helical winding corresponding to the predetermined number of layers that has been previously set as the number of layers to be formed by helical winding has terminated (step S125), and when it is determined that the helical winding has not terminated (step S125: NO), the fiber winding apparatus is returned to the above-mentioned step S105. Accordingly, the winding angles and the widths of the fiber band sections are measured at the layers formed by the helical winding and stored in the memory (not shown) of the control device 100.

On the other hand, when it is determined that the helical winding corresponding to an extent of the predetermined number of layers has terminated (step S125: YES), the fiber winding apparatus (not shown) performs hoop winding corresponding to the predetermined number of layers (step S130). After completion of the hoop winding, the entire liner 301 on which the carbon fiber W is wound is heated (step S135). The thermosetting resin provided in the carbon fiber W wound on the liner 301 is cured by the heating process, and a fiber-reinforced layer constituted by the carbon fibers is formed on the surface of the liner 301 to complete the tank. Further, in a configuration in which the carbon fiber W (the single fibers) are impregnated with an ultraviolet-curing resin, ultraviolet light may be radiated to cure the resin in step S135. For example, the winding angle calculated in the above-mentioned fiber winding processing may be used to determine whether a quality of the tank 300 after completion is good.

According to the measuring apparatus 10 of the first embodiment as described above, since an image constituted by the reflected light Rs from the target region is imaged and the angle formed between the direction perpendicular to the longitudinal direction of the image constituted by the reflected light Rs in the obtained captured image and the axis CX of the liner 301 is calculated as the winding angle, the winding angle of the carbon fiber W in the target region can be precisely specified. This is because the carbon fiber W (the single fibers) has a property in which the reflected light Rs spreads widely in the direction perpendicular to the direction (the winding direction) of the fiber when light is radiated and the reflected light Rs does not spread much in the direction of the fiber.

In addition, since the image is formed by the diffusion plate 220, for example, even when a distance between the target region and the imaging device 240 is varied due to the wound and stacked carbon fibers W or the like, the longitudinal direction can be precisely specified when variation in width of the formed image occurs. For this reason, the winding angle can be precisely specified. Further, in the embodiment, the diffusion plate 220 may be omitted. In the configuration, as a mechanism configured to focus the target region, for example, a mechanism configured to vary a distance between the imaging device and the target region, or various optical systems are provided, and the winding angle can be precisely specified even when the distance between the target region and the imaging device 240 is varied. However, as the diffusion plate 220 is used as in this embodiment, advantages of being able to omit a mechanism configured to focus the target region, easily determine the winding angle, and minimize an increase in size or cost of the measuring apparatus, or an advantage of being able to readily determine the winding angle because a unique interference fringe of a laser does not occur is provided.

B. Second Embodiment

Figure 11:
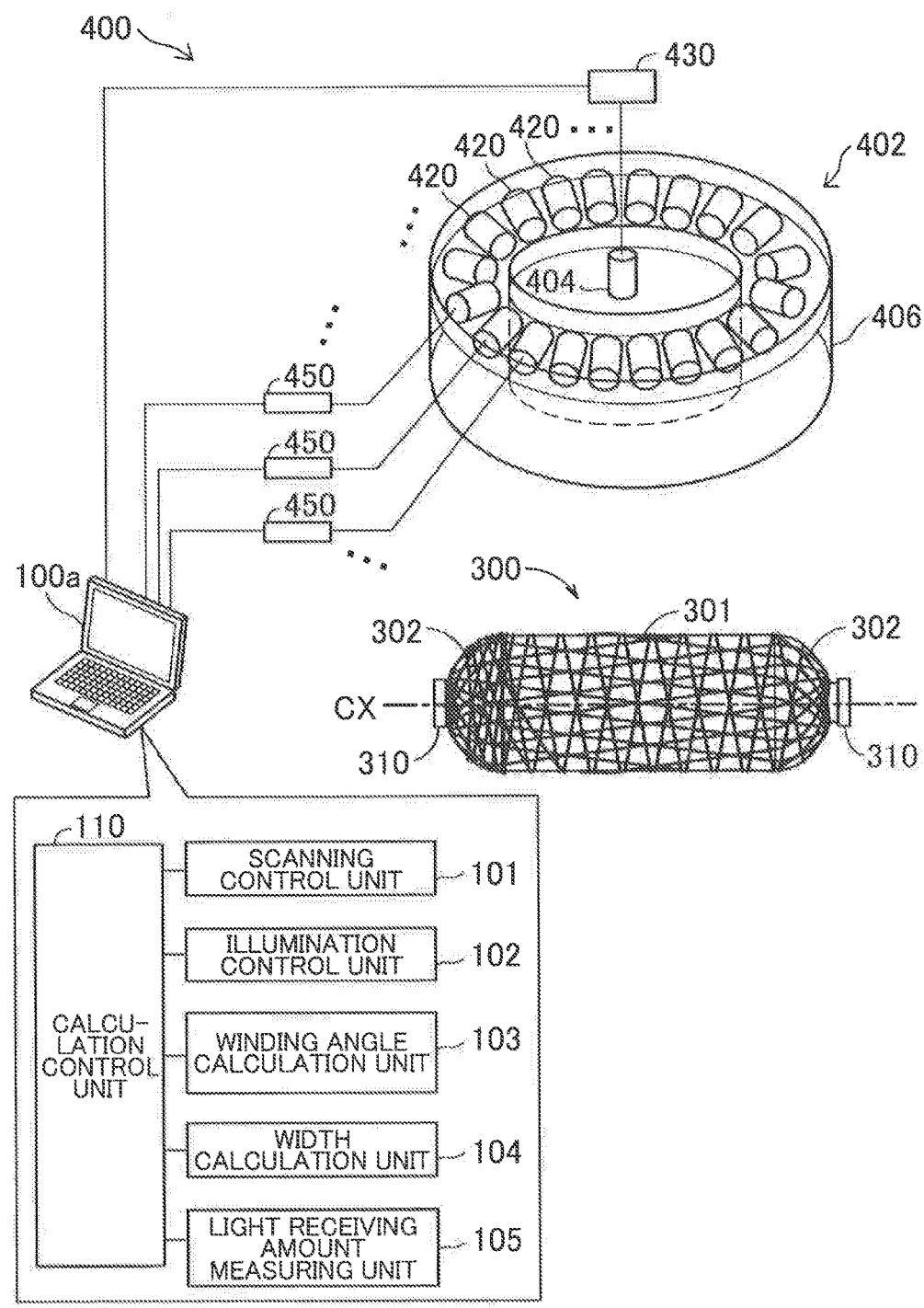
FIG. 11 is a view for describing a schematic configuration of a measuring apparatus of a second embodiment.

B1. Apparatus Configuration:

FIG. 11 is a view for describing a schematic configuration of a measuring apparatus of a second embodiment. In FIG. 11, like FIG. 1, in addition to a measuring apparatus 400 of the second embodiment, the tank 300 during manufacture is shown. In the measuring apparatus 400, laser beams are sequentially radiated to predetermined measurement positions at different predetermined angles, a magnitude of luminance of the reflected light is measured by a photoelectric device at a fixed position with respect to a predetermined measurement position, and the winding angle is calculated using the magnitude of the measured luminance.

As shown in FIG. 11, the measuring apparatus 400 includes a light source unit 402, a light receiving unit 404, an amplifier device 430, a plurality of illumination control units 450, and a control device 100a. The light source unit 402 includes a housing 406 and a plurality of laser light sources 420 accommodated in the housing 406 and annularly arranged at predetermined intervals, and is disposed vertically above the tank 300. The housing 406 has a cylindrical appearance. In the housing 406, an inner wall facing a central axial hole has optical transparency. A posture of each of the laser light sources 420 is previously adjusted such that a laser beam is radiated to the same position on the surface of the tank 300 (the liner 301) through the axial hole of the housing 406.

Figure 12:
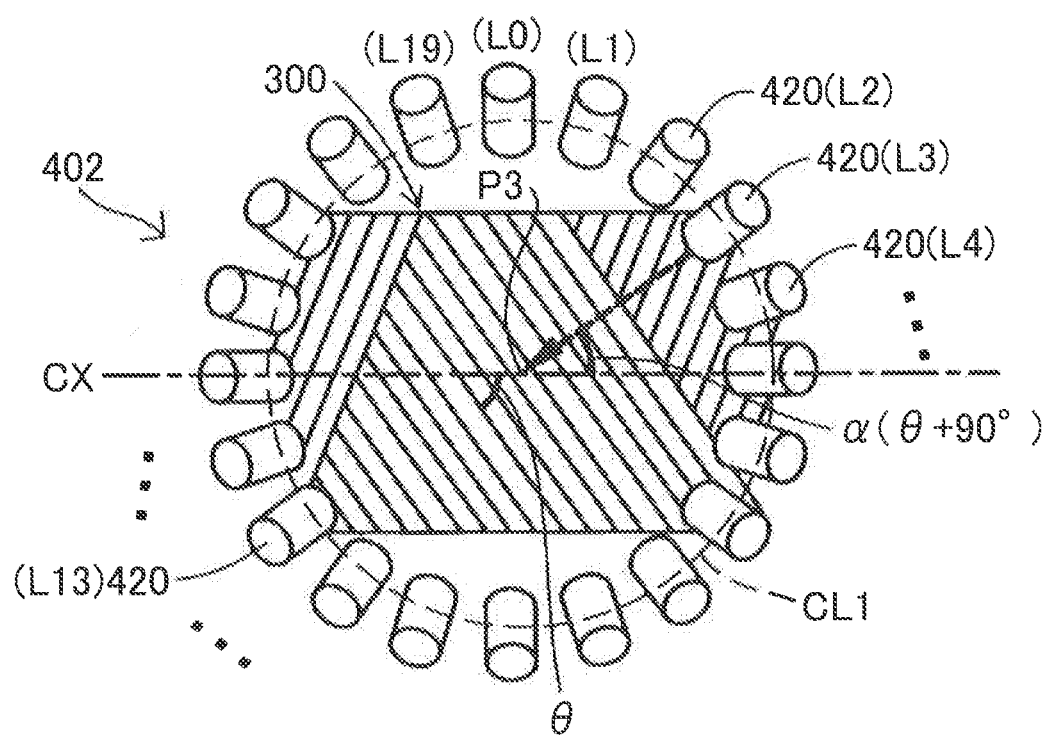
FIG. 12 is a view for describing disposition positions of laser light sources when seen from vertically above.

FIG. 12 is a view for describing disposition positions of the laser light sources 420 when seen from vertically above. In FIG. 12, a portion of the tank 300 disposed vertically below the light source unit 402 is shown together with the laser light sources 420. Further, in FIG. 12, the housing 406 is omitted.

As shown in FIG. 12, in the embodiment, the light source unit 402 includes a total of twenty laser light sources 420. The laser light sources 420 are disposed along a virtual circle CL1 parallel to a horizontal plane at positions vertically above the tank 300 at predetermined intervals. In other words, the laser light sources 420 are disposed on the virtual circle CL1 at angular intervals of 18°. Hereinafter, positions at which the laser light sources 420 are disposed are referred to as radiation positions L0 to L19. The radiation position L0 is set at a position such that an angle (hereinafter, referred to as "a radiation angle") between a projected line when an imaginary line connecting the position L0 and the radiation position of the laser beam is projected onto a virtual plane including the axis CX and the axis CX is an angle for intersection thereof at +90°. In addition, the other radiation positions L1, L2, . . . are set to be offset by 18° rightward from the radiation position L0.

As shown in FIG. 11, the light receiving unit 404 is disposed at a substantially central position of the laser light sources 420, which are annularly arranged. More specifically, the light receiving unit 404 is disposed at a position corresponding to a central point of the virtual circle CL1 shown by a broken line of FIG. 12. In the embodiment, the light receiving unit 404 includes a photoelectric device, performs photoelectric conversion when light is received, and outputs an electrical signal according to an intensity of the received light. The amplifier device 430 is electrically connected to the light receiving unit 404 and the control device 100a, and the electrical signal output from the light receiving unit 404 is amplified and transmitted to the control device 100a. The illumination control units 450 are electrically connected to the laser light sources 420, respectively. The illumination control units 450 control radiation of the laser beams from the connected laser light sources 420. The illumination control units 450 are electrically connected to the control device 100a, and control the laser light sources 420 according to an instruction from the control device 100a.

The control device 100a is distinguished from the control device 100 of the first embodiment by a CPU (not shown) being added for functioning as a light receiving amount measuring unit 105. Since the configuration of the control device 100a is otherwise the same as the control device 100 of the first embodiment, the same components are designated by the same reference numerals, and detailed description thereof will be omitted. The light receiving amount measuring unit 105 measures a luminance value based on the electrical signal received from the amplifier device 430 according to an instruction of the calculation control unit 110.

Further, while not shown, both of the light source unit 402 and the light receiving unit 404 are disposed in order to be movable parallel to the axis CX by the scanning unit (not shown).

Figure 13:
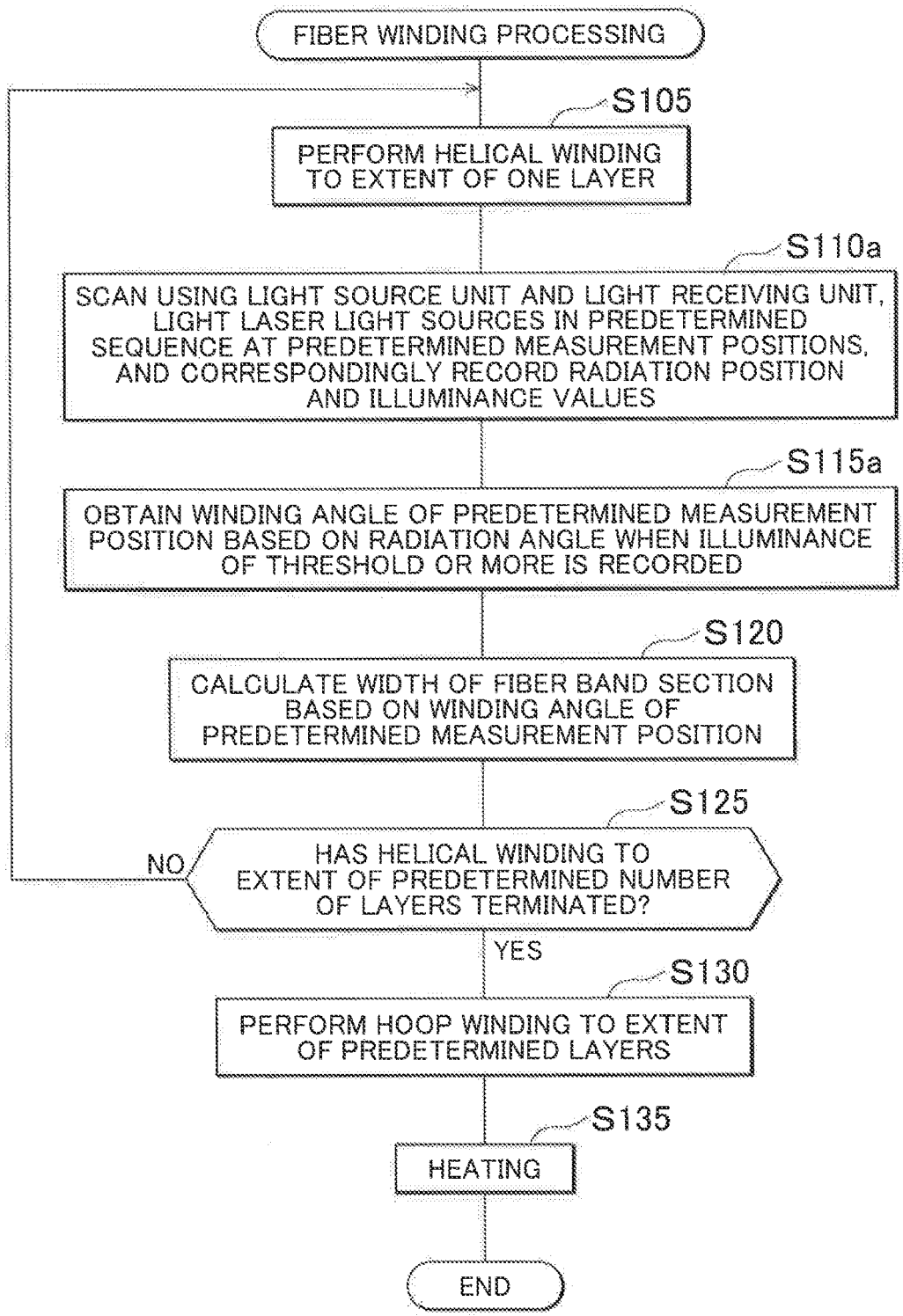
FIG. 13 is a flowchart showing a procedure of fiber winding processing according to the second embodiment.

B2. Fiber Winding Processing:

FIG. 13 is a flowchart showing a procedure of fiber winding processing according to the second embodiment. The fiber winding processing according to the second embodiment is distinguished from the fiber winding processing according to the first embodiment shown in FIG. 4 in that step S110a is performed instead of step S110 and step S115a is performed instead of step S115. Since other procedures of the fiber winding processing according to the second embodiment are the same as in the fiber winding processing according to the first embodiment, the same procedures are designated by the same reference numerals, and detailed description thereof will be omitted.

After completion of step S105, the light source unit 402 and the light receiving unit 404 are moved parallel to the axis CX by the scanning unit (not shown), the illumination control unit 102 controls the illumination control units 450 at the predetermined measurement positions such that they sequentially light the laser light sources 420 in a predetermined sequence, the light receiving amount measuring unit 105 measures a luminance value using the electrical signal from the amplifier device 430, and the winding angle calculation unit 103 correspondingly records information of "to which radiation position the laser beam is radiated" obtained from the illumination control unit 102 and the luminance value measured by the light receiving amount measuring unit 105 (step S110a).

Figure 14:
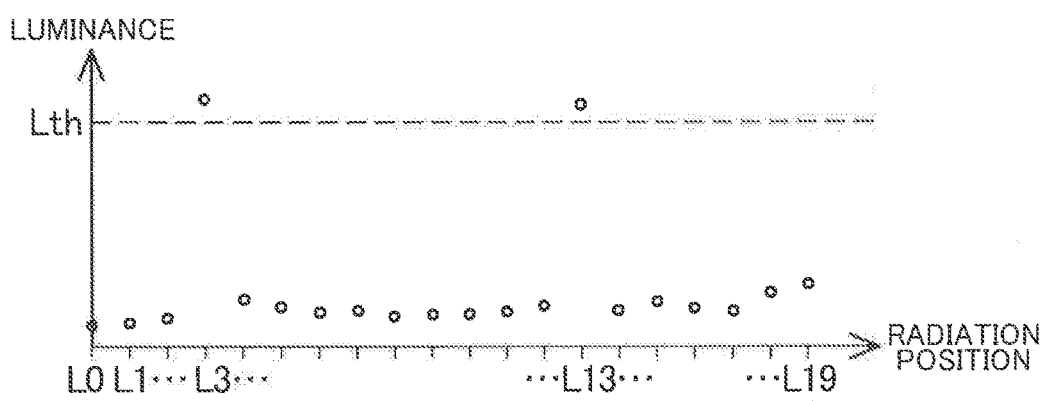
FIG. 14 is a view for describing an example of correspondence between a radiation position and a luminance value.

FIG. 14 is a view for describing an example of correspondence between the radiation position and the luminance value. In FIG. 14, a horizontal axis shows a radiation position and a vertical axis shows luminance. Further, since on the horizontal axis, L1, L2, . . . are arranged in sequence from the radiation position L0, the horizontal axis can also be regarded as showing radiation time. In FIG. 14, an example of the case in which step S110a is performed at the predetermined measurement position P3 as shown in FIG. 12 among the predetermined measurement positions is shown.

As shown in FIG. 14, luminance values corresponding to the radiation positions L0 to L2, L4 to L12 and L14 to L19 are relatively low. On the other hand, luminance values corresponding to the radiation position L3 and the radiation position L13 are relatively high. The two radiation positions L3 and L13 correspond to positions at angular intervals of 180°. The fact that the luminance values corresponding to the two radiation positions L3 and L13 are higher than the luminance values corresponding to the other radiation positions is because, when the laser beams radiated from the radiation positions L3 and L13 are projected to the virtual plane including the axis CX, the projected line is perpendicular to the longitudinal direction of the carbon fiber W, and like the above-mentioned case of FIG. 2, the reflected light is radiated to a wide range and a quantity of light received by the light receiving unit 404 is increased. In step S110a, correspondence between the radiation positions and the measured luminance values are recorded according to the predetermined measurement positions.

As shown in FIG. 13, the winding angle calculation unit 103 obtains the winding angles of the predetermined measurement positions based on the radiation angles of the laser beams when a luminance value larger than a predetermined threshold is recorded (step S115a). For example, in the above-mentioned example of FIG. 12 and FIG. 14, the luminance values corresponding to the two radiation positions L3 and L13 are higher than a predetermined threshold Lth. Here, as shown in FIG. 12, a radiation angle α at the radiation position L3 is a direction perpendicular to the longitudinal direction of the carbon fiber W. Accordingly, the winding angle θ of the predetermined measurement position P3 is obtained as a value obtained by subtracting 90° from the radiation angle α. After completion of step S115a, the above-mentioned steps S120 to S135 are performed.

According to the measuring apparatus 400 of the second embodiment as described above, like the measuring apparatus 10 of the first embodiment, the winding angle of the carbon fiber W in the target region can be precisely specified. In addition, in the measuring apparatus 400 of the second embodiment, since the laser beams are sequentially radiated to the target region from the plurality of laser light sources 420 disposed at the plurality of radiation positions L0 to L19, the radiation angle of the laser beam with respect to the target region can be easily varied. In addition, since a mechanical mechanism is not needed to vary the radiation angle of the laser beam with respect to the target region, reduction in size or cost of the measuring apparatus 400 can be achieved.

C. Third Embodiment

Figure 15:
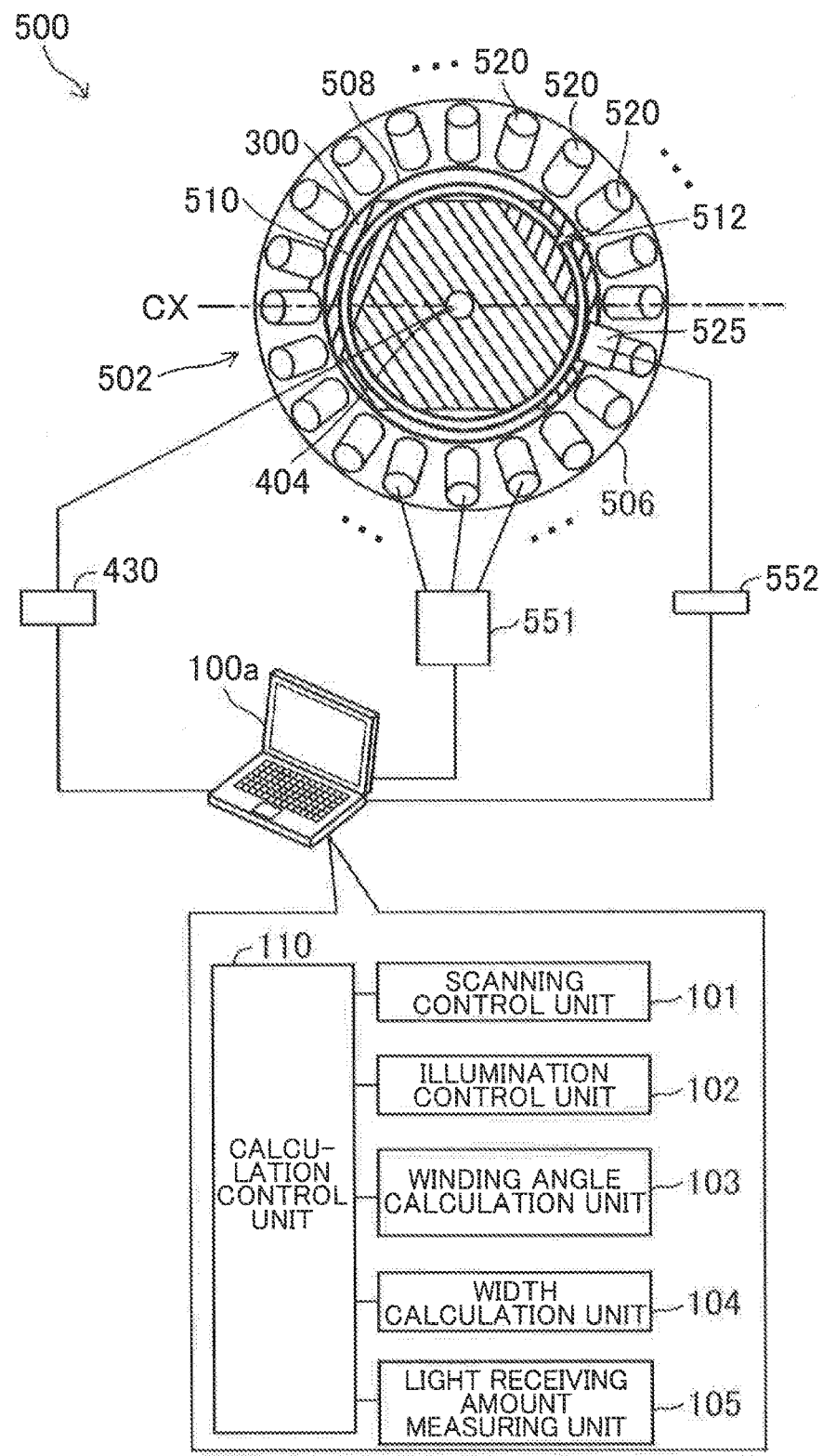
FIG. 15 is a view for describing a schematic configuration of a measuring apparatus of a third embodiment.
Figure 16:
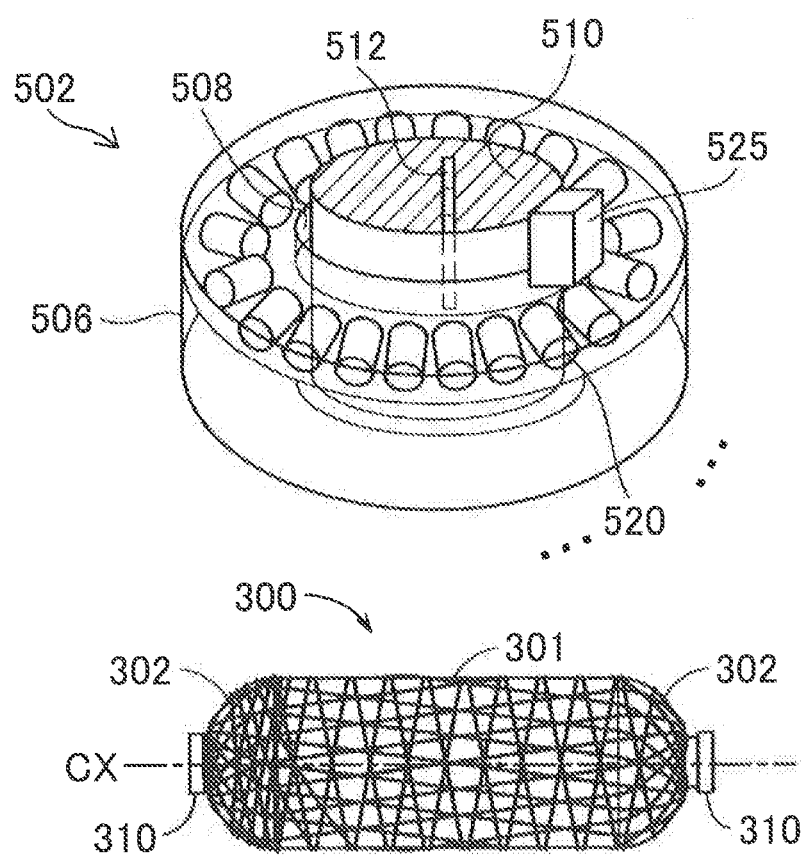
FIG. 16 is a perspective view showing a detailed configuration of a light source unit of a third embodiment.

C1. Apparatus Configuration:

FIG. 15 is a view for describing a schematic configuration of a measuring apparatus of a third embodiment. FIG. 16 is a perspective view showing a detailed configuration of a light source unit of the third embodiment. In FIG. 15, like FIG. 12, in addition to a measuring apparatus 500 of the third embodiment, the tank 300 during manufacture is shown. In addition, also in FIG. 16, in addition to a light source unit 502 of the third embodiment, the tank 300 during manufacture is shown. The measuring apparatus 500 of the third embodiment is distinguished from the measuring apparatus 400 of the second embodiment in that the radiation position is continuously varied when light is radiated to the target region. The measuring apparatus 500 is the same as the measuring apparatus 400 in that a luminance value of the reflected light from the target region is measured and the winding angle is calculated using the measured luminance value.

As shown in FIG. 15, the measuring apparatus 500 of the third embodiment is distinguished from the measuring apparatus 400 of the second embodiment in that the light source unit 502 is provided instead of the light source unit 402, one lighting control unit 551 is provided instead of the plurality of illumination control units 450, and a rotation control unit 552 is added. Since the configuration of the measuring apparatus 500 of the third embodiment is otherwise the same as the measuring apparatus 400 of the second embodiment, the same components are designated by the same reference numerals, and detailed description thereof will be omitted.

As shown in FIG. 16, the measuring apparatus 500 includes a housing 506, a plurality of illumination devices 520 accommodated in the housing 506 and arranged annularly at predetermined intervals, a diffusion plate 508, a shielding ring 510 and a rotation drive unit 525, and is disposed vertically above the tank 300.

The housing 506 has a cylindrical appearance, and like the housing 406 of the second embodiment, includes an inner wall facing a central axial hole and having optical transparency. However, in the embodiment, the inner wall is constituted by the diffusion plate 508. The diffusion plate 508 has a cylindrical appearance, and like the diffusion plate 220 of the first embodiment, diffuses and emits incident light. More specifically, the light entering from the illumination devices 520 is diffused to be emitted to the shielding ring 510.

The total number of illumination devices 520 is equal to the total number of laser light sources 420 of the second embodiment, which is 20. In addition, the illumination devices 520 are disposed along a virtual circle parallel to the horizontal plane at positions vertically above the tank 300 at predetermined intervals, like the laser light sources 420 of the second embodiment. However, in the embodiment, the total number of illumination devices 520 is not limited to 20, and further, a distance between neighboring illumination devices 520 may be not constant. The illumination devices 520 are constituted by LED lamps, differently from the laser light sources 420. Further, instead of an LED lamp, an arbitrary type of illumination device such as an incandescent light bulb, an ultra-high pressure mercury lamp, a metal halide lamp, a xenon lamp, or the like, may be used.

The shielding ring 510 has a thin cylindrical appearance, and a slit 512 extending in an axial direction is formed at a side surface thereof. The shielding ring 510 blocks light emitted from the illumination devices 520 and diffused by the diffusion plate 508, except for the portion at which the slit 512 is formed. In other words, the light entering the slit 512 in the light emitted from the illumination devices 520 and diffused by the diffusion plate 508 reaches the predetermined measurement positions through an axial hole of the housing 506 (an axial hole of the shielding ring 510). The shielding ring 510 may be formed of an arbitrary material having a light blocking effect, for example, a metal, a black resin material, and so on. A width of the slit 512 (a length in a circumferential direction) is small, and in the embodiment, 1/360 of the entire circumference length (a length corresponding to 1°). Further, the width of the slit 512 is not limited to 1/360 of the entire circumference length and may be an arbitrary size. As the width of the slit 512 is reduced, angular resolution of the luminance values is improved. However, since the quantity of light that irradiates the target region is reduced as the width of the slit 512 is reduced, light sensitivity of the light receiving unit 404 is preferably increased further. Further, in FIG. 15, in order to clearly indicate the position of the slit 512, for the convenience of description, the slit 512 is shown as reaching an upper end of the shielding ring 510.

The rotation drive unit 525 includes a motor and a rotary encoder, which are not shown, and measures a rotation angle of the shielding ring 510 to inform the rotation control unit 552 of the rotation angle while rotating and driving the shielding ring 510 according to an instruction from the rotation control unit 552.

As shown in FIG. 15, the lighting control unit 551 is electrically connected to the illumination devices 520, and controls lighting and turning off the light of the illumination devices 520. The rotation control unit 552 controls rotation of the shielding ring 510 with respect to the rotation drive unit 525 according to an instruction from the calculation control unit 110. Accordingly, the position of the slit 512 is controlled, and which position is to be irradiated with the light from the predetermined measurement positions (the target region) is controlled. In addition, the rotation control unit 552 informs the winding angle calculation unit 103 of the rotation angle informed from the rotation drive unit 525. The calculation control unit 110 instructs rotation of the shielding ring 510 with respect to the rotation control unit 552 according to the instruction from the control device 100a, and specifies a radiation angle when light is radiated to the predetermined measurement position based on the rotation angle informed from the rotation control unit 552.

According to the above-mentioned configuration, in the measuring apparatus 500, as the shielding ring 510 is rotated, the position of the slit 512 can be continuously varied and the radiation angle of the light to the predetermined measurement position can be continuously varied.

Figure 17:
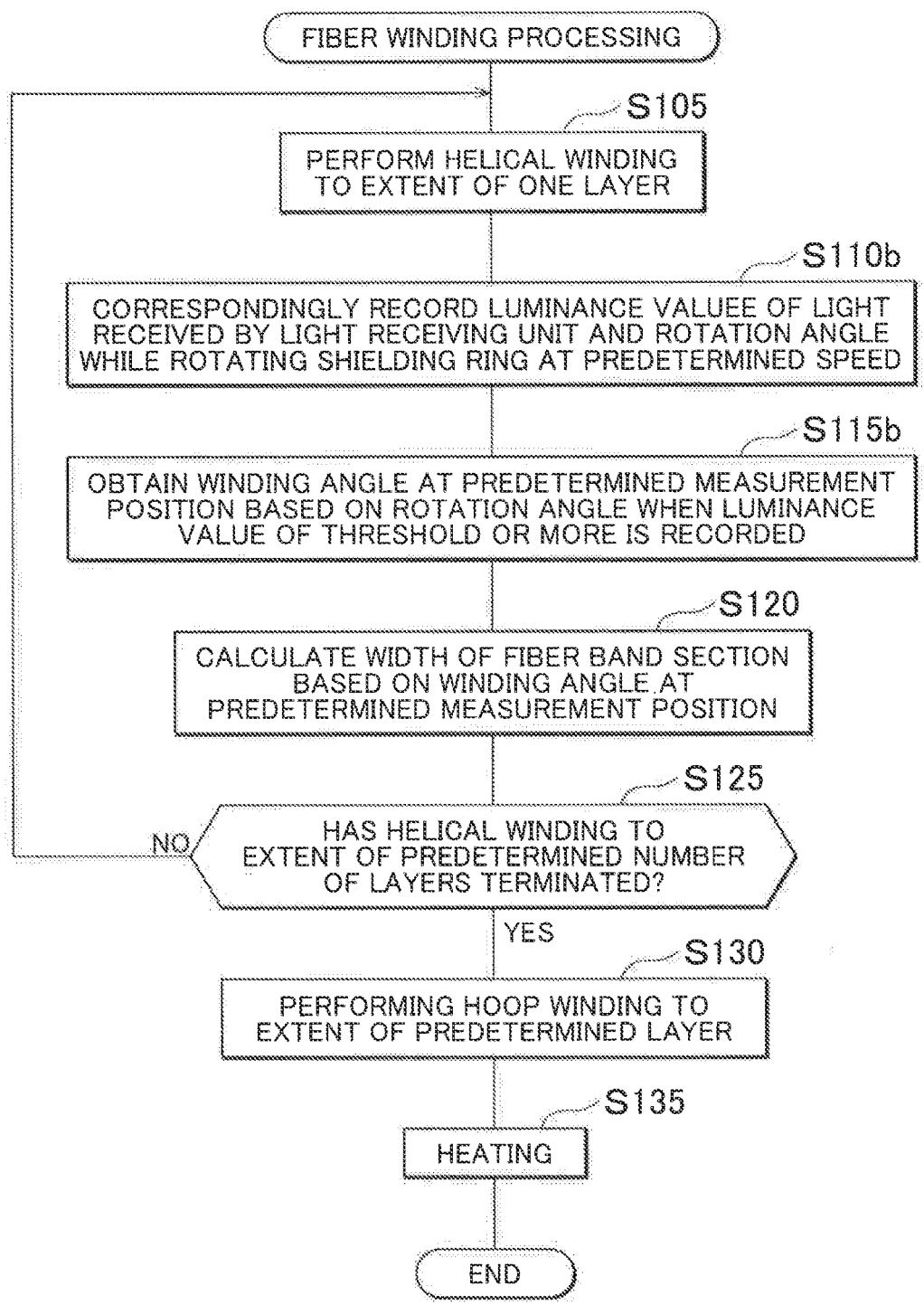
FIG. 17 is a flowchart showing a procedure of fiber winding processing according to the third embodiment.

C2. Fiber Winding Processing:

FIG. 17 is a flowchart showing a procedure of fiber winding processing according to the third embodiment. The fiber winding processing of the third embodiment is distinguished from the fiber winding processing of the first embodiment shown in FIG. 4 in that step S110b is performed instead of step S110 and step S115b is performed instead of step S115. Since other procedures of the fiber winding processing of the third embodiment are the same as in the fiber winding processing of the first embodiment, the same procedures are designated by the same reference numerals, and detailed description thereof will be omitted.

After completion of step S105, the light source unit 502 and the light receiving unit 404 are moved parallel to the axis CX by the scanning unit (not shown), the illumination control unit 102 controls the lighting control unit 551 such that it lights all of the illumination devices 520 at the predetermined measurement positions, and the calculation control unit 110 controls the rotation drive unit 525 via the rotation control unit 552 such that it makes one rotation of the shielding ring 510 at a predetermined speed and correspondingly records the rotation angle informed from the rotation drive unit 525 and the luminance value measured by the light receiving amount measuring unit 105 (step S110b). Here, the calculation control unit 110 correspondingly records the rotation angle whenever the rotation angle is varied by 1° and the measured luminance value. Accordingly, in the measuring apparatus 500, the angular resolution of the luminance values is 1°.

Figure 18:
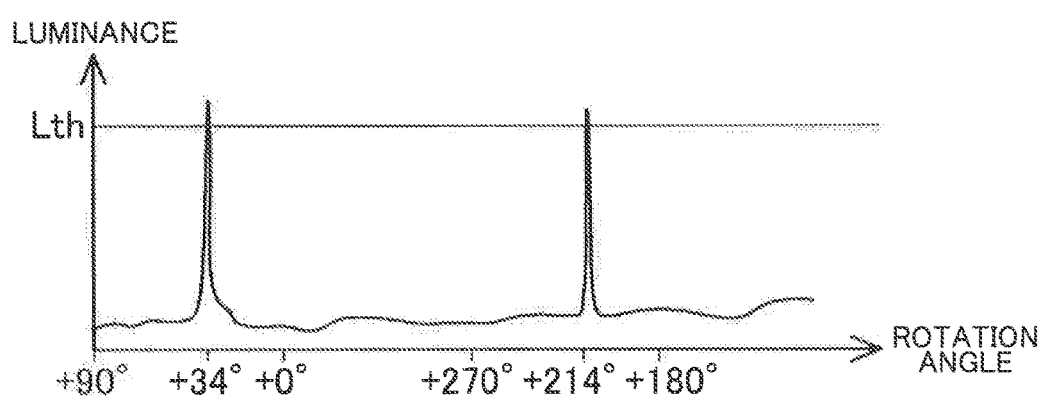
FIG. 18 is a view for describing an example of correspondence between a rotation angle and a luminance value.

FIG. 18 is a view for describing an example of correspondence between the rotation angle and the luminance value. In FIG. 18, a horizontal axis shows a rotation angle and a vertical axis shows a luminance value. Further, in the embodiment, the shielding ring 510 starts to rotate from a state in which the slit 512 is disposed at a position corresponding to the illumination device 520 being furthest away from the axis CX and disposed at an uppermost side in the drawings, among the illumination devices 520 in FIG. 15, and rotates rightward. In addition, the rotation angle at a starting position of rotation is +90°. As described above, since the resolution of the luminance values recorded in the embodiment is 1°, while the recorded results are an aggregation of a total of 360 measured values in actuality, in FIG. 18, for the convenience of illustration, the values are represented as continuous values. From the recorded results shown in FIG. 18, when the rotation angle is +34° and +214°, the luminance value is recorded as a value larger than a threshold Lth, and for other values of rotation angle, the luminance value is recorded as a value smaller than the threshold Lth.

As shown in FIG. 17, after completion of step S110b, the winding angle calculation unit 103 obtains the winding angle of the predetermined measurement positions based on the rotation angle of the shielding ring 510 when a luminance value equal to or larger than the threshold Lth is recorded (step S115b). This is when the rotation angle of the slit 512 coincides with the radiation angle of the light radiated through the slit 512. Accordingly, like step S110a of the above-mentioned second embodiment, the winding angle of the carbon fiber W is obtained. After completion of step S115b, the above-mentioned steps S120 to S135 are performed.

According to the measuring apparatus 500 of the above-mentioned third embodiment, like the measuring apparatus 10 of the first embodiment, the winding angle of the carbon fiber W in the target region can be precisely specified. In addition, in the measuring apparatus 500 of the third embodiment, since the position of the slit 512 is continuously varied by rotating the shielding ring 510, the radiation angle of the light can be continuously and easily varied. Accordingly, the angular resolution of the luminance values can be improved in comparison with the second embodiment, and the winding angle of the carbon fiber W can be precisely specified.

D. Fourth Embodiment

Figure 19:
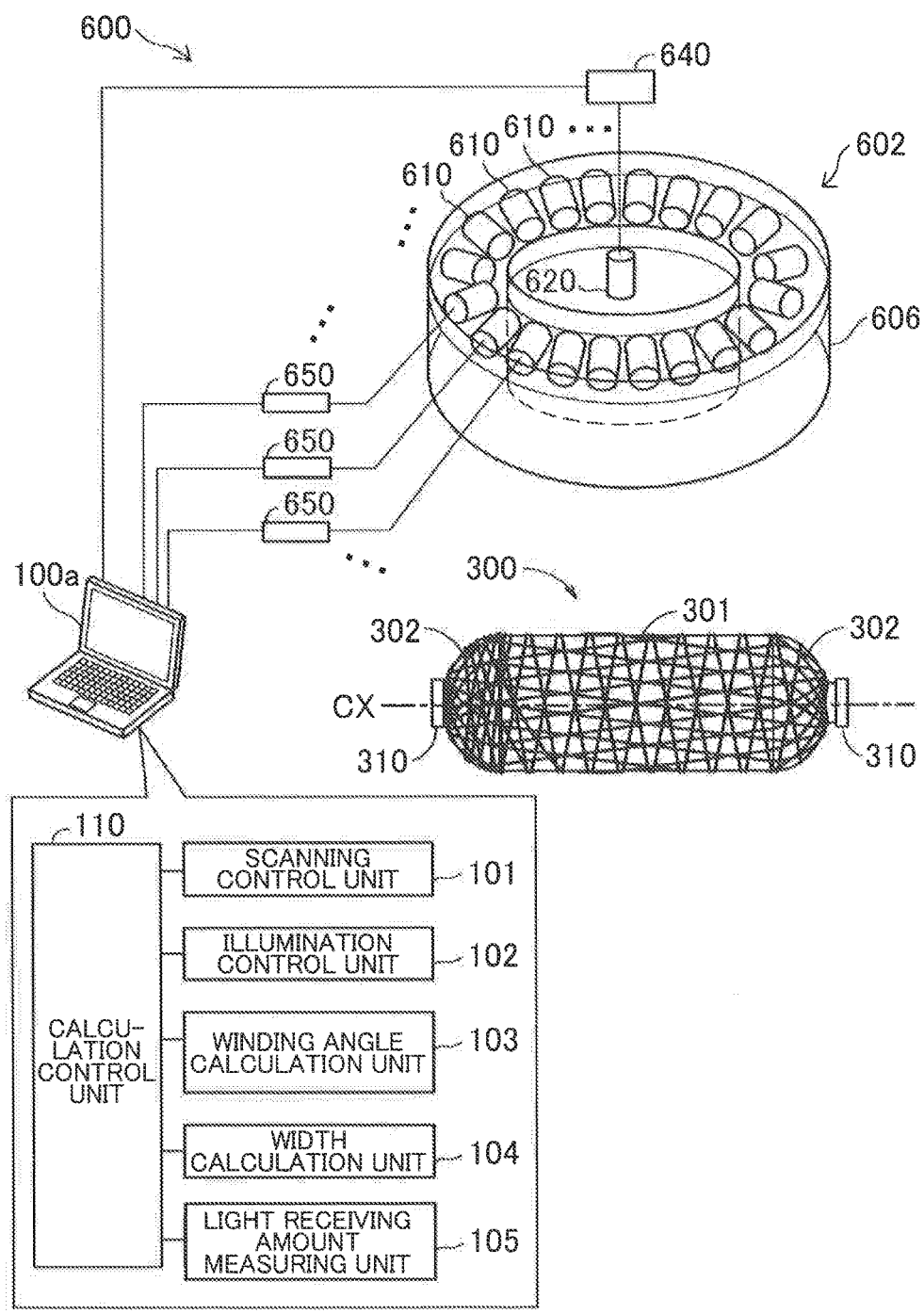
FIG. 19 is a view for describing a schematic configuration of a measuring apparatus of a fourth embodiment.

D1. Apparatus Configuration:

FIG. 19 is a view for describing a schematic configuration of a measuring apparatus of a fourth embodiment. In FIG. 19, like FIG. 1, in addition to a measuring apparatus 600 of the fourth embodiment, the tank 300 during manufacture is shown. An external configuration of the measuring apparatus 600 of the fourth embodiment is similar to that of the measuring apparatus 400 of the second embodiment shown in FIG. 11. However, schematically describing, the configuration of the measuring apparatus 600 can be said to have a configuration in which a configuration of a light radiation side and a configuration of a light receiving side in the measuring apparatus 400 of the second embodiment are reversed.

The measuring apparatus 600 includes a laser light source 620, a laser light source control unit 640, a light receiving unit 602, a plurality of amplifier devices 650 and a control device 100a. The laser light source 620 is disposed vertically above the axial hole formed in a housing 606, which will be described below, and the laser beam is radiated from vertically above the tank 300 disposed vertically below the measuring apparatus 600. The laser light source control unit 640 is connected to the control device 100a and the laser light source 620, and controls lighting and turning off the light of the laser light source 620 according to an instruction from the control device 100a. The light receiving unit 602 includes a housing 606 and a plurality of photoelectric devices 610 accommodated in the housing 606 and annularly arranged at predetermined intervals, and is disposed vertically above the tank 300. Since the housing 606 has the same configuration as the housing 406 of the second embodiment, detailed description thereof will be omitted.

Figure 20:
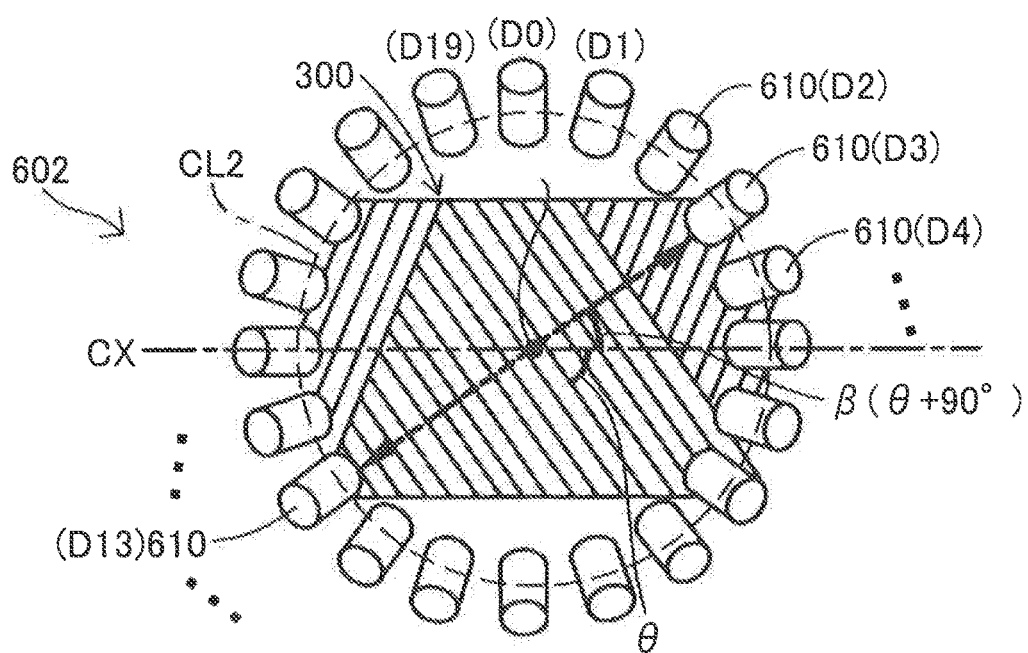
FIG. 20 is a view for describing disposition positions of photoelectric devices when seen from vertically above.

FIG. 20 is a view for describing disposition positions of the photoelectric devices 610 when seen from vertically above. In FIG. 20, a portion of the tank 300 disposed vertically below the light receiving unit 602 is shown together with the photoelectric devices 610. Further, in FIG. 12, the housing 606 is omitted.

As shown in FIG. 20, in the embodiment, the light receiving unit 602 is constituted by a total of 20 photoelectric devices 610. The photoelectric devices 610 are disposed at positions vertically above the tank 300 along a virtual circle CL2 parallel to a horizontal plane at predetermined intervals. In other words, the photoelectric devices 610 are disposed on the virtual circle CL2 at angular intervals of 18°. Further, as shown in FIG. 20, hereinafter, positions at which the photoelectric devices 610 are disposed are referred to as light receiving positions D0 to D19. The light receiving position D0 is set at a position such that an angle between a projected line when an imaginary line connecting the position D0 and the radiation position (the predetermined measurement position) of the laser beam is projected onto a virtual plane including the axis CX and the axis CX is an angle for intersection thereof at 90°. In addition, the other light receiving positions D1, D2, . . . are set to be offset rightward at angular intervals of 18° from the light receiving position D0.

As shown in FIG. 19, the laser light source 620 is disposed at substantially a central position of the photoelectric devices 610 that are annularly arranged. More specifically, the laser light source 620 may be disposed at a position corresponding to a central point of the virtual circle CL2 shown by a broken line in FIG. 20. The amplifier devices 650 are connected to the photoelectric devices 610, respectively. The amplifier devices 650 are electrically connected to the control device 100a. The amplifier devices 650 have the same function as the amplifier device 430 of the above-mentioned second embodiment.

Further, while not shown, both of the laser light source 620 and the light receiving unit 602 are disposed in order to be movable parallel to the axis CX by the scanning unit (not shown). Since the control device 100a is the same as the control device 100a of the above-mentioned second embodiment, the same components are designated by the same reference numerals and detailed description thereof will be omitted.

Figure 21:
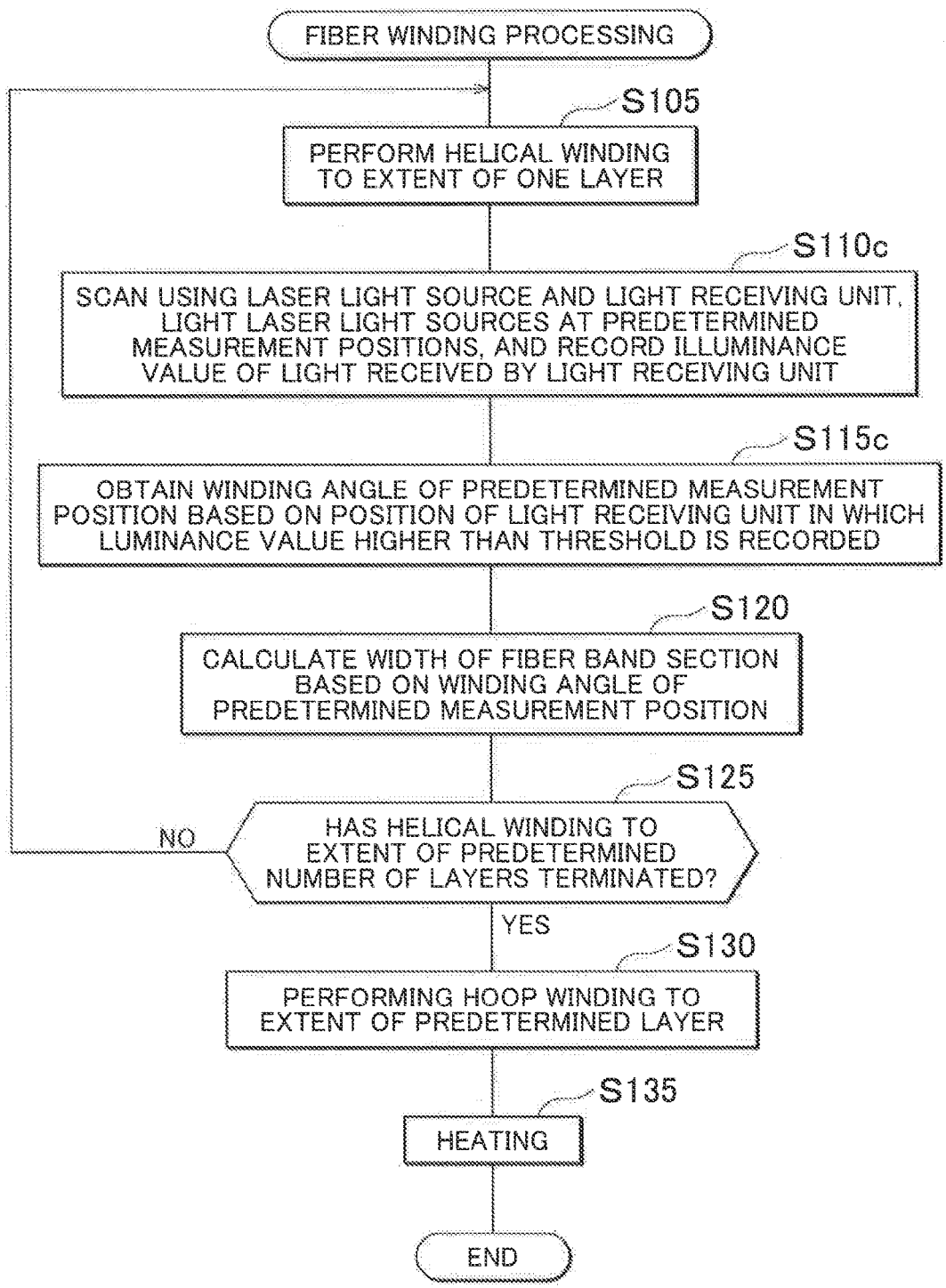
FIG. 21 is a flowchart showing a procedure of fiber winding processing according to the fourth embodiment.

D2. Fiber Winding Processing:

FIG. 21 is a flowchart showing a procedure of fiber winding processing of the fourth embodiment. The fiber winding processing of the fourth embodiment is distinguished from the fiber winding processing of the first embodiment shown in FIG. 4 in that step S110c is performed instead of step S110 and step S115c is performed instead of step S115. Since other procedures of the fiber winding processing of the fourth embodiment are the same as those of the fiber winding processing of the first embodiment, the same procedures are designated by the same reference numerals, and detailed description thereof will be omitted.

After completion of step S105, the laser light source 620 and the light receiving unit 602 are moved parallel to the axis CX by the scanning unit (not shown), the illumination control unit 102 lights the laser light source 620 to irradiate the target region with light at the predetermined measurement positions, and the light receiving amount measuring unit 105 records the luminance of the light received by the photoelectric devices 610 at the photoelectric devices 610 (step S110c).

Figure 22:
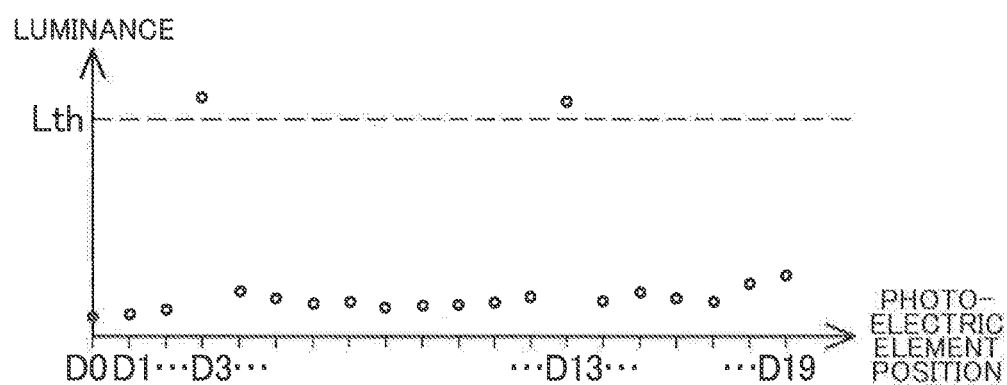
FIG. 22 is a view for describing an example of correspondence between positions and luminance values of the photoelectric devices.

FIG. 22 is a view for describing an example of correspondence between positions and luminance values of the photoelectric devices 610. In FIG. 22, a horizontal axis shows positions of the photoelectric devices 610 and a vertical axis shows luminance values. Further, on the horizontal axis, since D1, D2, . . . are arranged in sequence from the position D0, the horizontal axis can be regarded as showing light reception time. In FIG. 22, an example of the case in which step S110c is performed at the predetermined measurement position P3 as shown in FIG. 20 among the predetermined measurement positions is shown.

As shown in FIG. 22, luminance values corresponding to D0 to D2, D4 to D12 and D14 to D19 are relatively low. On the other hand, luminance values corresponding to the position D3 and the position D13 are relatively high. The two positions D3 and D13 correspond to positions at angular intervals of 180°. The fact that the luminance values of the light received by the photoelectric devices 610 at the two positions D3 and D13 are higher than the luminance value of the light received by the photoelectric device 610 at other positions has the same reason as that for the luminance values corresponding to the radiation positions L3 and L13 of the above-mentioned second embodiment being higher than the luminance values corresponding to other radiation positions.

As shown in FIG. 21, the winding angle calculation unit 103 obtains the winding angles of the predetermined measurement positions based on the positions of the photoelectric devices 610 on which the luminance values higher than a predetermined threshold are recorded (step S115c). For example, in the above-mentioned example of FIG. 22, the luminance values of the light received by the photoelectric devices 610 at the two positions D3 and D13 are higher than the predetermined threshold Lth. The fact that the luminance values at the two positions D3 and D13 are much higher than those at other positions means that a direction of the projected lines of line segments connecting the two positions D3 and D13 and the predetermined measurement positions is perpendicular to the longitudinal direction of the carbon fiber W. Accordingly, the winding angle θ of the predetermined measurement position P3 is obtained as a value obtained by subtracting 90° from an angle β between the projected line of the line segment connecting the position D3 and the predetermined measurement position P3 and the axis CX (or a value obtained by subtracting the angle between the projected line of the line segment connecting the position D13 and the measurement position P3 and the axis CX from 90°). After completion of step S115c, the above-mentioned steps S120 to S135 are performed.

According to the measuring apparatus 600 of the above-mentioned fourth embodiment, like the measuring apparatus 10 of the first embodiment, the winding angle of the carbon fiber W in the target region can be precisely specified. In addition, at the plurality of positions D0 to D19 surrounding the predetermined measurement position (the target region) and spaced a predetermined distance therefrom, since the reflected light from the target region is received and the luminance value is measured, the radiation direction of the reflected light in which the quantity of light of the reflected light from the target region is equal to or larger than a threshold can be precisely specified.

E. Modified Examples

E1. Modified Example 1

In the first embodiment, as shown in FIG. 5, first, while the longitudinal direction of the image constituted by the reflected light in the captured image is specified and then the angle between the specified longitudinal direction and the axis CX is specified as the winding angle, the embodiment is not limited thereto. First, the angle between the longitudinal direction of the image constituted by the reflected light in the captured image and the axis CX may be obtained and then the winding angle may be specified by subtracting 90° from the angle. Also in the configuration, the same effect as in the first embodiment is exhibited.

E2. Modified Example 2

In the embodiments, while the winding angle of the carbon fiber W due to helical winding is calculated, the winding angle of the carbon fiber W due to hoop winding may be calculated.

Figure 23:
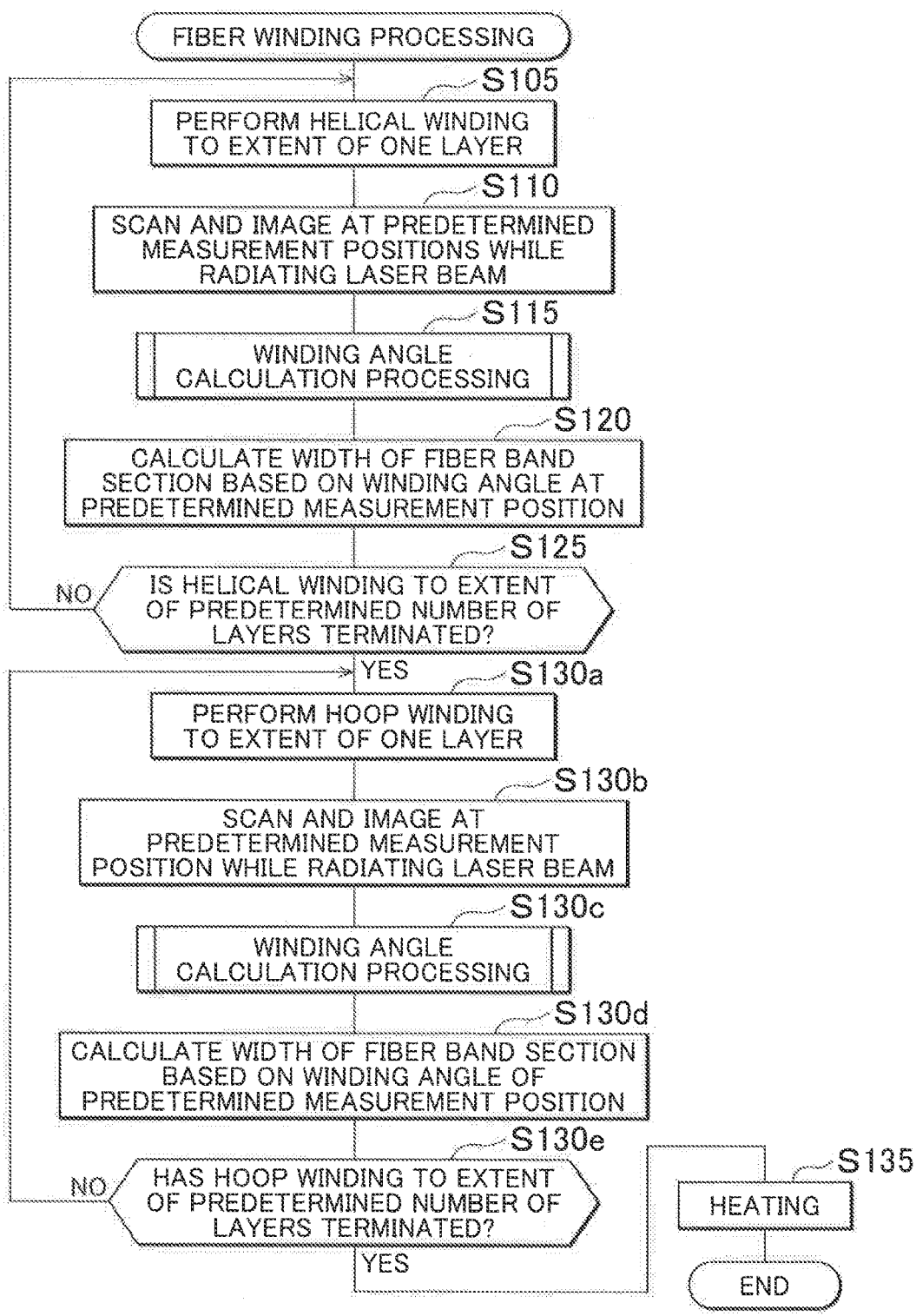
FIG. 23 is a flowchart showing a procedure of fiber winding processing according to a modified example.

FIG. 23 is a flowchart showing a procedure of fiber winding processing according to a modified example. The fiber winding processing of the modified example is distinguished from the procedure of the fiber winding processing according to the first embodiment shown in FIG. 4 in that step S130a to S130e are performed instead of step S130. Since other procedures of the fiber winding processing according to the modified example are the same as those of the fiber winding processing according to the first embodiment, the same procedures are designated by the same reference numerals, and detailed description thereof will be omitted.

In the above-mentioned step S125, when it is determined that helical winding to an extent of a predetermined number of layers has been completed (step S125: YES), the fiber winding apparatus (not shown) performs hoop winding to an extent of one layer on the surface of the liner 301 on which the helical winding has terminated using the carbon fiber W delivered from the bobbin 390 (step S130a). After that, steps S130b, S130c and S130d are performed in sequence. Step S130b is the same as step S110 in the helical winding. Similarly, step S130c is the same as step S115 in the helical winding, and step S130d is the same as step S120 in the helical winding. After completion of step S130d, the fiber winding apparatus (not shown) determines whether hoop winding to an extent of a predetermined number of layers previously set as the number of layers to be formed by hoop winding has terminated (step S130e), and when it is determined that hoop winding has not terminated (step S130e: NO), it returns to the above-mentioned step S130a. Accordingly, the winding angles and the widths of the fiber band sections are measured at the layers formed by the hoop winding and stored in the memory (not shown) of the control device 100. On the other hand, when it is determined that hoop winding to an extent of the predetermined number of layers has terminated (step S130e: YES), the above-mentioned step S135 is performed, and the fiber winding processing is terminated.

According to the above-mentioned configuration, in addition to the winding angle in the helical winding, the winding angle in the hoop winding can also be precisely specified. This modified example may also be applied to other embodiments in addition to the first embodiment. Further, in the embodiments and the modified examples, while the winding angle of the carbon fiber W in the cylindrical section 302 is calculated, the winding angle of the carbon fiber W in the dome sections 303 may be calculated instead of in the cylindrical section 302 or in addition to in the cylindrical section 302.

E3. Modified Example 3

In the first embodiment, while the reflected light imaging unit 200 is moved parallel to the axis CX, the embodiment is not limited thereto. The liner 301 may be moved along the axis CX as a configuration in which the liner 301 is movable along the axis CX, instead of the reflected light imaging unit 200 or in addition to the reflected light imaging unit 200. In addition, not only the reflected light imaging unit 200 but also the control device 100 may be moved. That is, in general, as at least one of the liner 301 and the reflected light imaging unit 200 is moved, the scanning unit in which the reflected light imaging unit 200 can be relatively moved with respect to the liner 301 to switch the predetermined measurement position (the target region) may also be used in the measuring apparatus of the embodiment. In addition, also in the second to fourth embodiments, the liner 301 may be configured to be movable along the axis CX, and the liner 301 may also be moved along the axis CX. Further, unlike in the above-mentioned embodiments and modified examples, the reflected light imaging unit 200 (the first embodiment), the light source unit 402 and the light receiving unit 404 (the second embodiment), the light source unit 502 and the light receiving unit 404 (the third embodiment), and the laser light source 620 and the light receiving unit 602 (the fourth embodiment) may also not be moved. Also in these configurations, the winding angle can be precisely specified at one predetermined measurement position.

E4. Modified Example 4

In the second embodiment, among the total of 20 laser light sources 420, a total of 10 consecutive laser light sources 420 at arbitrary positions may also be omitted. As shown in FIG. 14, the radiation positions at which the measured luminance values are larger than the threshold Lth are two places separated by 180° from each other. If one of the radiation positions is known, since the winding angle of the carbon fiber W can be specified, even when a total of 10 consecutive laser light sources 420 at arbitrary positions are omitted, the winding angle can be specified. For the same reason, also in the fourth embodiment, a total of 10 consecutive photoelectric devices 610 at arbitrary positions may also be omitted. Further, in the second embodiment, in addition to a total of 10 consecutive laser light sources 420 as described above, laser light sources 420 corresponding to angles greatly offset from a previously determined winding angle may also be omitted. Similarly, also in the fourth embodiment, in addition to a total of 10 consecutive photoelectric devices 610, the photoelectric devices 610 corresponding to angles greatly offset from a previously determined winding angle may also be omitted. According to the configurations of the modified examples, the light source unit 402 and the light receiving unit 602 can be reduced in size, and further, manufacturing costs of the measuring apparatuses 400 and 600 can be minimized to a low level.

E5. Modified Example 5

In the second and third embodiments, instead of the light receiving unit 404, like the first embodiment, the imaging device 240 may also be disposed to obtain a captured image. In addition, in this case, like the first embodiment, the winding angle of the carbon fiber W can be specified based on the image constituted by the reflected light in the obtained image.

E6. Modified Example 6

In the third embodiment, while the singular slit 512 is provided, two slits 512 may be provided. In the configuration, two slits may be separated by 180° from each other. Also in the configuration, like the third embodiment, the winding angle of the carbon fiber W in the target region can be precisely specified. In addition, since the quantity of light radiated to the predetermined measurement position (the target region) can be increased, the amplifier device 430 can be omitted or an amplifier device 430 having a small gain and a low cost can be used as the amplifier device 430. For this reason, manufacturing costs of the measuring apparatus 500 can be minimized to a low level.

E7. Modified Example 7

In the second embodiment, while the plurality of laser light sources 420 are annularly disposed and used, the embodiment is not limited thereto. For example, a single laser light source 420 may be rotated and driven like the shielding ring 510 of the third embodiment. Also in the above-mentioned configuration, the radiation direction of the light from the laser light sources 420 can be continuously varied, and the winding angle can be more precisely calculated. In addition, in the fourth embodiment, while the plurality of photoelectric devices 610 are annularly disposed and used, the embodiment is not limited thereto. For example, a single photoelectric device 610 may be rotated and driven like the shielding ring 510 of the third embodiment. Also in the configuration, the reflected light of the light from the laser light source 620 can be received at a plurality of positions that are continuously varied, and the winding angle can be more precisely calculated. In addition, in the first, second and fourth embodiments, the laser light sources 210, 420 and 620 may be substituted with another light source such as an LED or the like.

E8. Modified Example 8

In the embodiments, while the width of the fiber band section is also calculated together with the winding angle, calculation of the width of the fiber band section may also be omitted. In addition, in the embodiments, while the calculated winding angle is used to determine whether a quality of the tank 300 after completion is good, the embodiments are not limited thereto. For example, when a range of allowable winding angles with respect to the predetermined measurement positions is previously set and the winding angle calculated in the fiber winding processing deviates from the range, an alarm may be displayed on displays of the control devices 100 and 100a. In addition, the helical winding may be stopped together with display of the alarm. As a result, manufacture of the tank 300 having a low quality can be stopped, and the carbon fiber W can be prevented from being wastefully used. Further, also for the width of the fiber band section, a range of allowable widths may be previously set for an alarm to be displayed or the helical winding to be stopped.

E9. Modified Example 9

In the first embodiment, while the winding angle is an angle between the projected line when the carbon fiber W is projected to the virtual plane serving as the virtual plane including the axis CX of the liner 301 and substantially parallel to the target region that is the measuring target for the winding angle and the axis CX, the embodiment is not limited thereto. For example, the winding angle may be an angle between the above-mentioned projected line and the direction parallel to the Z-axis through a central position in the longitudinal direction (the X-axial direction) of the liner 301 on the axis CX. That is, in general, the winding angle may be an angle between an arbitrary direction that can be set as a reference direction on the liner 301, which is referred to as the direction parallel to the Z-axis through the axis CX and the central position in the longitudinal direction (the X-axial direction) of the liner 301 on the axis CX and the above-mentioned projected line. In addition, in the above-mentioned configuration, in step S210, the angle formed between the direction perpendicular to the longitudinal direction of the image constituted by the reflected light in the captured image and the reference direction of the liner 301 may be specified as the winding angle. Similarly, also when the winding angle is specified in the second to fourth embodiments, an arbitrary reference direction in the liner 301 may be used without being limited to the axis CX.

E10. Modified Example 10

In the first, second and fourth embodiments, while the winding angle of the carbon fiber W is measured using the laser beam having a diameter that is about 1/10 of the diameter of the carbon fiber W, the embodiment is not limited thereto. For example, when a laser beam having a diameter that is slightly larger than the diameter of each of the single fibers is used, the winding angle of each of the single fibers can be measured. In the above-mentioned configuration, the single fiber corresponds to a subordinate concept of the carbon fiber in the following claims.

E11. Modified Example 11

In the embodiment, while the winding angle is specified (calculated), instead of specification of the winding angle, the direction (the winding direction) of the carbon fiber W may be specified. Here, the term "winding direction" is not limited to a direction specified as an angle between the winding direction and a certain reference direction and, for example, has a wide meaning including a rough direction that is referred to as "a +X direction and a +Z direction" and "a −X direction and a +Z direction." For example, in the first embodiment, the band shape is extracted from the captured image obtained in step S110 and matching (shape comparison) between the shape and a previously provided model (a band-shaped model) is performed. A method of previously associating a winding direction of the carbon fiber W to a model, and as a result of the above-mentioned matching, specifying (estimating) a rough winding direction of the carbon fiber W in actuality from the winding direction associated with the most similar model may be employed.

E12. Modified Example 12

In the embodiment, while all of the measuring apparatuses 10, 400, 500 and 600 measure the angle of winding the carbon fiber W onto the liner 301 for a tank, the embodiment is not limited to the liner 301 for a tank and, for example, the angle of winding the carbon fiber W onto an arbitrary base material such as a liner or the like for parts of an automobile, an aircraft, or the like, may also be measured.

E13. Modified Example 13

In the embodiment, a portion of the configuration realized by software may be substituted with hardware, and on the contrary, a portion of the configuration realized by hardware may be substituted with software. In addition, when a portion or the entirety of the functions of the embodiment is realized by software, the software (the computer program) may be provided as a form stored in a computer-readable recording medium. The "computer-readable recording medium" is not limited to a portable recording medium such as a flexible disk or a CD-ROM and may also include an internal storage device in a computer such as various RAMs, ROMs, or the like, and an external storage device fixed to a computer such as a hard disk or the like. That is, the "computer-readable recording medium" has a wide meaning including an arbitrary recording medium in which data can be permanently stored other than temporarily.

The embodiment is not limited to the above-mentioned embodiments and modified examples and may be realized by various configurations without departing from the spirit of the present disclosure. For example, technical features in the embodiments and the modified examples corresponding to technical features in the aspects disclosed in the Summary may be appropriately replaced or combined in order to solve some or all of the above-mentioned tasks or accomplish some or all of the above-mentioned effects. In addition, the technical features may be appropriately deleted unless the technical features are described as essential in the specification.

What is claimed is:

1. A measuring apparatus for measuring a winding angle of a carbon fiber wound on a base material with respect to the base material, the measuring apparatus comprising:
   a light source configured to radiate light to a target region on the base material serving as a measuring target for the winding angle;
   a diffusion plate configured to suppress linear transmission of reflected light from the target region and form an image constituted by the reflected light;
   an imaging device configured to capture the image formed by the diffusion plate to obtain a captured image; and
   a winding angle calculation unit configured to calculate an angle formed between a direction perpendicular to a longitudinal direction of the image constituted by the reflected light in the captured image and a reference direction in the base material as the winding angle.

2. A measuring apparatus for measuring a winding angle of a carbon fiber wound on a base material with respect to the base material, the measuring apparatus comprising:
   a light source unit configured to sequentially radiate light to a target region from a plurality of positions, the plurality of positions surrounding the target region on the base material serving as a measuring target for the winding angle and spaced a predetermined distance from the target region;
   a light receiving unit configured to receive reflected light from the target region and measure a quantity of light of the reflected light; and
   a winding angle calculation unit configured to calculate an angle formed between a direction perpendicular, on the target region, to a radiation direction of radiation light from the light source unit corresponding to the reflected light having a measured quantity of light that is a predetermined value or more and a reference direction in the base material as the winding angle.

3. The measuring apparatus according to claim 2, wherein the light source unit includes:
   a plurality of light sources disposed at the plurality of positions, respectively; and
   an illumination control unit configured to sequentially radiate light from the plurality of light sources to the target region.

4. The measuring apparatus according to claim 2, wherein the light source unit includes:
- a light source configured to radiate light from an arbitrary position to the target region, the arbitrary position surrounding the target region and spaced a predetermined distance from the target region;
- a cylindrical light shielding unit rotatably disposed along the light sources between the light sources and the target region, and in which a slit is formed; and
- a rotation control unit configured to control rotation of the light shielding unit such that a position of the slit becomes a position corresponding to the plurality of positions.

5. A measuring apparatus for measuring a winding angle of a carbon fiber wound on a base material with respect to the base material, the measuring apparatus comprising:
- a light source configured to radiate light to a target region on the base material serving as a measuring target for the winding angle;
- a light receiving unit configured to receive reflected light from the target region and measure a quantity of light of the reflected light at a plurality of positions, the plurality of positions surrounding the target region and spaced a predetermined distance from the target region; and
- a winding angle calculation unit configured to calculate an angle formed between a direction perpendicular, on the target region, to a direction of the reflected light having a measured quantity of light that is a predetermined value or more and a reference direction in the base material as the winding angle.

6. The measuring apparatus according to claim 5, wherein the light receiving unit includes:
- a plurality of photoelectric devices disposed at the plurality of positions, respectively; and
- a light receiving amount measuring unit configured to specify the quantity of light from a magnitude of current output from the plurality of photoelectric devices.

7. The measuring apparatus according to claim 1, further comprising:
- a scanning unit configured to switch the target region by moving at least one of the base material and the measuring apparatus to relatively move the measuring apparatus with respect to the base material; and
- a width calculation unit configured to calculate a width of a region on which the carbon fiber is wound at a single winding angle using a distance between both ends of a plurality of target regions arranged in a direction of relatively moving the measuring apparatus with respect to the base material and in which the calculated winding angles coincide with each other and the winding angle.

8. The measuring apparatus according to claim 1, wherein the base material is a liner for a tank.

9. The measuring apparatus according to claim 2, further comprising:
- a scanning unit configured to switch the target region by moving at least one of the base material and the measuring apparatus to relatively move the measuring apparatus with respect to the base material; and
- a width calculation unit configured to calculate a width of a region on which the carbon fiber is wound at a single winding angle using a distance between both ends of a plurality of target regions arranged in a direction of relatively moving the measuring apparatus with respect to the base material and in which the calculated winding angles coincide with each other and the winding angle.

10. The measuring apparatus according to claim 2, wherein the base material is a liner for a tank.

11. The measuring apparatus according to claim 5, further comprising:
- a scanning unit configured to switch the target region by moving at least one of the base material and the measuring apparatus to relatively move the measuring apparatus with respect to the base material; and
- a width calculation unit configured to calculate a width of a region on which the carbon fiber is wound at a single winding angle using a distance between both ends of a plurality of target regions arranged in a direction of relatively moving the measuring apparatus with respect to the base material and in which the calculated winding angles coincide with each other and the winding angle.

12. The measuring apparatus according to claim 5, wherein the base material is a liner for a tank.

13. A method of measuring a winding angle of a carbon fiber wound on a base material with respect to the base material, the method comprising:
- radiating light to a target region on the base material serving as a measuring target for the winding angle;
- forming an image constituted by reflected light from the target region using a diffusion plate;
- imaging the image formed by the diffusion plate and obtaining a captured image; and
- calculating an angle formed between a direction perpendicular to a longitudinal direction of the image constituted by the reflected light in the captured image and a reference direction in the base material as the winding angle.

14. A method of measuring a winding angle of a carbon fiber wound on a base material with respect to the base material, the method comprising:
- sequentially radiating light from a plurality of positions surrounding a target region on the base material serving as a measuring target for the winding angle and spaced a predetermined distance from the target region to the target region;
- receiving reflected light from the target region and measuring a quantity of light of the reflected light; and
- calculating an angle formed between a direction perpendicular, on the target region, to a radiation direction of radiation light corresponding to the reflected light having a measured quantity of light that is a predetermined value or more and a reference direction in the base material as the winding angle.

15. A method of measuring a winding angle of a carbon fiber wound on a base material with respect to the base material, the method comprising:
- radiating light to a target region on the base material serving as a measuring target for the winding angle;
- receiving reflected light from the target region and measuring a quantity of light of the reflected light at a plurality of positions surrounding the target region and spaced a predetermined distance from the target region; and calculating an angle formed between a direction perpendicular, on the target region, to a direction of the reflected light having a measured quantity of light that is a predetermined value or more and a reference direction in the base material as the winding angle.

* * * * *